US012373136B2

(12) United States Patent
Gururaj et al.

(10) Patent No.: US 12,373,136 B2
(45) Date of Patent: Jul. 29, 2025

(54) HOST STORAGE COMMAND MANAGEMENT FOR DYNAMICALLY ALLOCATED NAMESPACE CAPACITY IN A DATA STORAGE DEVICE TO IMPROVE THE QUALITY OF SERVICE (QOS)

(71) Applicant: WESTERN DIGITAL TECHNOLOGIES, INC., San Jose, CA (US)

(72) Inventors: Pavan Gururaj, Bangalore (IN); Dinesh Babu, Bangalore (IN); Sridhar Sabesan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 88 days.

(21) Appl. No.: 18/355,793

(22) Filed: Jul. 20, 2023

(65) Prior Publication Data

US 2024/0427523 A1 Dec. 26, 2024

Related U.S. Application Data

(60) Provisional application No. 63/510,060, filed on Jun. 23, 2023.

(51) Int. Cl.
*G06F 3/06* (2006.01)
(52) U.S. Cl.
CPC .......... *G06F 3/0659* (2013.01); *G06F 3/0607* (2013.01); *G06F 3/0679* (2013.01)
(58) Field of Classification Search
CPC ..... G06F 3/0679; G06F 3/0659; G06F 3/0607
USPC .................................................. 711/154, 103
See application file for complete search history.

(56) References Cited

U.S. PATENT DOCUMENTS

| | | | |
|---|---|---|---|
| 6,209,066 B1 | 3/2001 | Holzle | |
| 9,047,216 B2 | 6/2015 | Soran | |
| 10,564,857 B2 | 2/2020 | Benisty | |
| 10,768,820 B2 | 9/2020 | Subramanian | |
| 10,866,740 B2 | 12/2020 | Benisty | |
| 11,429,293 B1 | 8/2022 | Vankamamidi | |
| 12,106,134 B2 * | 10/2024 | Pinto | ................... G06F 9/45558 |
| 2007/0168634 A1 | 7/2007 | Morishita | |

(Continued)

OTHER PUBLICATIONS

Junyi Shu, Ruidong Zhu, Yun Ma, Gang Huang, Hong Mei, Xuanzhe Liu, and Xin Jin. Mar. 25, 2023. Disaggregated RAID Storage in Modern Datacenters. In Proceedings of the 28th ACM International Conference on Architectural Support for Programming Languages and Operating Systems, vol. 3 (ASP LOS 2023). (Year: 2023).

*Primary Examiner* — Hashem Farrokh
(74) *Attorney, Agent, or Firm* — Patent Law Works LLP

(57) ABSTRACT

Systems, methods, and data storage devices for host storage command management for dynamically allocated floating namespaces are described. A data storage device may support multiple host namespaces allocated in its non-volatile storage medium and include a floating namespace pool that includes at least some data units from those host namespaces. Host storage commands to be processed using the floating namespace pool may be received and payload sizes may be determined. A next host storage command may be determined based on the relative payload sizes and executed using a data unit from the floating namespace pool, for example, based on allocating virtual command queues to the floating namespace pool and sorting the incoming host storage commands by payload size.

19 Claims, 9 Drawing Sheets

(56) References Cited

U.S. PATENT DOCUMENTS

| | | |
|---|---|---|
| 2009/0234897 A1 | 9/2009 | Qi |
| 2013/0067186 A1 | 3/2013 | Pronovost |
| 2014/0250269 A1 | 9/2014 | Shanbhag |
| 2016/0124843 A1* | 5/2016 | Kanno ................ G06F 12/0246 711/103 |
| 2017/0024160 A1 | 1/2017 | Feldman |
| 2018/0217951 A1* | 8/2018 | Benisty ............... G06F 13/1642 |
| 2019/0121543 A1 | 4/2019 | Frolikov |
| 2020/0401348 A1 | 12/2020 | Satoyama |
| 2021/0103399 A1 | 4/2021 | Lyu |
| 2021/0334207 A1* | 10/2021 | Kanno ................ G06F 12/0246 |
| 2022/0137844 A1* | 5/2022 | Goss .................... G06F 3/0608 711/154 |
| 2022/0391091 A1 | 12/2022 | Frolikov |
| 2023/0058424 A1 | 2/2023 | Frolikov |
| 2023/0143076 A1 | 5/2023 | Clifton |
| 2023/0185476 A1 | 6/2023 | Bert |
| 2023/0418516 A1 | 12/2023 | Weiss |
| 2024/0303114 A1 | 9/2024 | Sabesan |

\* cited by examiner

HOST STORAGE COMMAND MANAGEMENT FOR DYNAMICALLY ALLOCATED NAMESPACE CAPACITY IN A DATA STORAGE DEVICE TO IMPROVE THE QUALITY OF SERVICE (QOS)

TECHNICAL FIELD

The present disclosure generally relates to improving processing efficiency in data storage devices and, more particularly, to using dynamically allocated namespace capacity to accelerate processing of host storage commands to meet quality of service requirements.

BACKGROUND

Multi-device storage systems utilize multiple discrete data storage devices, generally disk drives (solid-state drives (SSD), hard disk drives (HDD), hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

To support the faster speeds and low latencies needed for many distributed applications, direct memory access storage protocols, such as non-volatile memory express (NVMe), have become important in storage system deployment. NVMe enables fast access to non-volatile memory devices connected to servers through peripheral component interconnect express (PCIe) buses. Namespaces and corresponding logical host connections may be used to manage access between host applications and the host data stored in the attached namespaces of the data storage devices. In some configurations, NVMe-over-Fabric (NVMeoF) enables servers to share NVMe flash storage as if it were local memory within the host system's file system.

With growing storage demands and the cost of storage, storage arrays, such as storage area networks (SANs), may be thinly provisioned and use administrator notifications when they run out of space. In thinly provisioned deployments, the goal may be to add capacity (in the form of additional data storage devices) only as it is needed. Most disk drives, such as SSDs, have a fixed capacity and it is not possible to add capacity to the data storage device after it is deployed. Similarly, namespaces are generally allocated in the disk drives in fixed capacity blocks. In thinly provisioned systems, underutilized namespaces within individual data storage devices may represent significant wasted capacity that may cause new devices to be added despite available capacity in one or more allocated but underutilized namespaces.

Uneven namespace utilization may be created by a number of factors, typically driven by the corresponding host applications and operational demands. Some namespaces may simply be associated with applications that generate more or less data and, therefore, require different amounts of storage space. Some namespaces may support write intensive applications, while other may be read intensive. Some namespaces may have higher performance requirements, which may impact resource availability for garbage collection and other processes for managing and reclaiming previously used capacity, as well as drive the sheer volume of data being stored or accessed. As a result, some namespaces may be fast filling, while other namespaces may be slower filling. The net result may be capacity starvation for some namespaces and unused capacity for other namespaces.

Under NVMe storage protocols, namespaces have a fixed capacity when created and attached to a host. The host system may, in turn, map the fixed capacity namespaces to available capacity in its file system. The storage system may not have the capability to reallocate capacity within existing data storage devices and corresponding namespaces as, in thin provisioned systems, all capacity in each added data storage device may be allocated to specific namespaces, non-volatile memory (NVM) sets, and/or endurance groups. Even if unused capacity is identified, it may not be available to supplement the processing of host storage commands and, therefore, not fully support the quality of service commitments for a particular data storage device, storage array, or storage system.

Therefore, there still exists a need for storage systems that can efficiently utilize flexible and dynamically allocated non-volatile memory capacity to supplement the defined host namespaces within thinly provisioned data storage devices to meet quality of service challenges.

SUMMARY

Various aspects for host storage command management for dynamically allocated namespace capacity in a data storage device are described. More particularly, once a floating namespace pool is allocated for a data storage device or set of data storage devices, various methods for establishing virtual connections and ordering host storage commands to meet quality of service requirements are described.

One general aspect includes a system including a storage controller configured to: allocate, for at least one data storage device, a floating namespace pool may include of a plurality of data units, where at least one data unit of the plurality of data units is allocated to a host namespace in the at least one data storage device; determine a plurality of host storage commands directed to the at least one data storage device; determine a payload size for each host storage command of the plurality of host storage commands; determine, based on relative payload sizes of each host storage command of the plurality of host storage commands, a next host storage command from the plurality of host storage commands; and execute, using a data unit in the floating namespace pool, the next host storage command.

Implementations may include one or more of the following features. The storage controller may be further configured to expose the floating namespace pool as a host managed device memory. The storage controller may be further configured to: enable a virtual command queue for the floating namespace pool; receive the plurality of host storage commands in the virtual command queue; and sort the plurality of host storage commands based on the relative payload sizes to determine the next host storage command. Sorting the plurality of host storage commands may place the plurality of host storage commands in size order from largest payload size to smallest payload size in the virtual command queue; and the next host storage command may have the largest payload size. The storage controller may be further configured to: receive each host storage command of the plurality of host storage commands as a submission queue entry; and determine whether each host storage command is a storage command type selected from a block storage command corresponding to a block payload size; and a key storage command corresponding to a scatter gather list. Determining the payload size for each host storage command may be based on the block payload size for block storage commands, and aggregation of entries of the scatter gather list for key storage commands. The storage controller may be further configured to: assign, responsive to each submission queue entry, an initial priority to each host storage command; and selectively modify, responsive to the payload size for each host storage command, the initial priority for selected host storage commands to a higher priority than the initial priority for that host storage command. Determining the next host storage command may be based on the higher priority for at least one host storage command. The storage controller may be further configured to: determine a buffer allocation threshold for the host storage commands; compare the payload size for each host storage command to the buffer allocation threshold; and select host storage commands for the higher priority responsive to the payload size for that host storage command exceeding the buffer allocation threshold. The floating namespace pool may be allocated among a plurality of floating namespace volumes and the storage controller may be further configured to: enable, for each floating namespace volume of the plurality of floating namespace volumes, a virtual command queue; and allocate host storage commands across the virtual command queues of the plurality of floating namespace volumes. Determining the next host storage command may include selecting a host storage command from a next virtual command queue on a distributed basis among the virtual command queues of the plurality of floating namespace volumes. The storage controller may be further configured to: enable a virtual channel for each virtual command queue of the plurality of floating namespace volumes; sort the plurality of host storage commands by payload size; and distribute the plurality of host storage commands in payload size order among the virtual command queues for the plurality of floating namespace volumes. The distributed basis may include parallel processing of the virtual command queues for the plurality of floating namespace volumes using the corresponding virtual channels. The system may include a plurality of data storage devices, where each data storage device of the plurality of data storage devices may include: a non-volatile storage medium configured for a plurality of host namespaces, where at least a portion of data units allocated to the plurality of host namespaces is allocated to the floating namespace pool; and a host interface configured to receive the plurality of host storage commands directed to that data storage device.

Another general aspect includes a computer-implemented method that includes: allocating, for at least one data storage device, a floating namespace pool may include of a plurality of data units, where at least one data unit of the plurality of data units is allocated to a host namespace in the at least one data storage device; determining a plurality of host storage commands directed to the at least one data storage device; determining a payload size for each host storage command of the plurality of host storage commands; determining, based on relative payload sizes of each host storage command of the plurality of host storage commands, a next host storage command from the plurality of host storage commands; and executing, using a data unit in the floating namespace pool, the next host storage command.

Implementations may include one or more of the following features. The computer-implemented method may include exposing the floating namespace pool as a host managed device memory. The computer-implemented method may include: enabling a virtual command queue for the floating namespace pool; receiving the plurality of host storage commands in the virtual command queue; and sorting the plurality of host storage commands based on the relative payload sizes to determine the next host storage command. Sorting the plurality of host storage commands may place the plurality of host storage commands in size order from largest payload size to smallest payload size in the virtual command queue, and the next host storage command may have the largest payload size. The computer-implemented method may include: receiving each host storage command of the plurality of host storage commands as a submission queue entry; and determining whether each host storage command is a storage command type selected from a block storage command corresponding to a block payload size and a key storage command corresponding to a scatter gather list. Determining the payload size for each host storage command may be based on: the block payload size for block storage commands and aggregation of entries of the scatter gather list for key storage commands. The computer-implemented method may include: assigning, responsive to each submission queue entry, an initial priority to each host storage command; and selectively modifying, responsive to the payload size for each host storage command, the initial priority for selected host storage commands to a higher priority than the initial priority for that host storage command, where determining the next host storage command is based on the higher priority for at least one host storage command. The computer-implemented method may include: determining a buffer allocation threshold for the host storage commands; comparing the payload size for each host storage command to the buffer allocation threshold; and selecting host storage commands for the higher priority responsive to the payload size for that host storage command exceeding the buffer allocation threshold. The computer-implemented method may include: allocating the floating namespace pool among a plurality of floating namespace volumes; enabling, for each floating namespace volume of the plurality of floating namespace volumes, a virtual command queue; and allocating host storage commands across the virtual command queues of the plurality of floating namespace volumes, where determining the next host storage command may include selecting a host storage command from a next virtual command queue on a distributed basis among the virtual command queues of the plurality of floating namespace volumes. The computer-implemented method may include: enabling a virtual channel and corresponding traffic channel for each virtual command queue of the plurality of floating namespace volumes; sorting the plurality of host storage commands by payload size; and distributing the plurality of host storage commands in payload size order among the virtual command queues for the plurality of floating namespace volumes, where the distributed basis may include parallel processing of the virtual command queues for the plurality of floating namespace volumes using the corresponding virtual channels and traffic channels.

Still another general aspect includes a system including: a processor; a memory; at least one data storage device may include a non-volatile memory configured for a plurality of host namespaces, where at least a portion of data units allocated to the plurality of host namespaces is allocated to a floating namespace pool; means for allocating, for the at least one data storage device, the floating namespace pool may include of a plurality of data units; means for determining a plurality of host storage commands directed to the at least one data storage device; means for determining a payload size for each host storage command of the plurality of host storage commands; means for determining, based on relative payload sizes of each host storage command of the plurality of host storage commands, a next host storage command from the plurality of host storage commands; and means for executing, using a data unit in the floating namespace pool, the next host storage command.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve utilization of non-volatile memory resources in individual data storage devices and in a multi-device storage system, such as by using a floating namespace pool to support dynamic processing of host storage commands. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
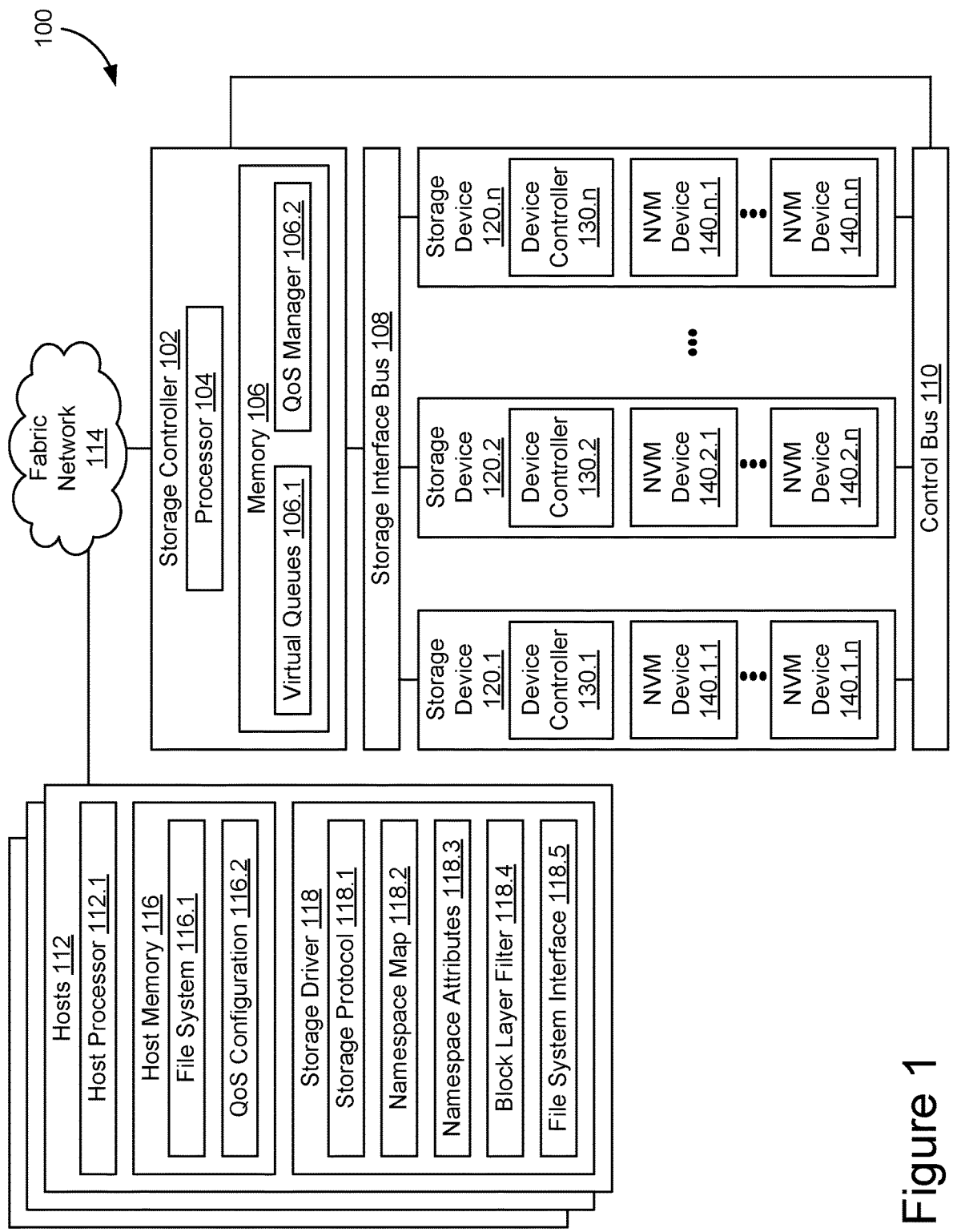
FIG. 1 schematically illustrates a multi-device storage system supporting a plurality of host systems.

FIG. 1 shows an embodiment of an example data storage system 100 with multiple data storage devices 120 supporting a plurality of host systems 112 through storage controller 102. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in a storage node with storage controller 102. In some embodiments, storage devices 120 may be configured in a server, storage array blade, all flash array appliance, or similar storage unit for use in data center storage racks or chassis. Storage devices 120 may interface with one or more host nodes or host systems 112 and provide data storage and retrieval capabilities for or through those host systems. In some embodiments, storage devices 120 may be configured in a storage hierarchy that includes storage nodes, storage controllers (such as storage controller 102), and/or other intermediate components between storage devices 120 and host systems 112. For example, each storage controller 102 may be responsible for a corresponding set of storage devices 120 in a storage node and their respective storage devices may be connected through a corresponding backplane network or internal bus architecture including storage interface bus 108 and/or control bus 110, though only one instance of storage controller 102 and corresponding storage node components are shown. In some embodiments, storage controller 102 may include or be configured within a host bus adapter for connecting storage devices 120 to fabric network 114 for communication with host systems 112.

In the embodiment shown, a number of storage devices 120 are attached to a common storage interface bus 108 for host communication through storage controller 102. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 112. In some embodiments, storage interface bus 108 may provide the primary host interface for storage device management and host data transfer, and control bus 110 may include limited connectivity to the host for low-level control functions. For example, storage interface bus 108 may support peripheral component interface express (PCIe) connections to each storage device 120 and control bus 110 may use a separate physical connector or extended set of pins for connection to each storage device 120.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of storage controller 102 and/or host systems 112. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, data storage devices 120 are solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controllers. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, storage controller 102 may be coupled to data storage devices 120 through a network interface that is part of host fabric network 114 and includes storage interface bus 108 as a host fabric interface. In some embodiments, host systems 112 are coupled to data storage system 100 through fabric network 114 and storage controller 102 may include a storage network interface, host bus adapter, or other interface capable of supporting communications with multiple host systems 112. Fabric network 114 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, storage interface bus 108 may be referred to as a host interface bus and provides a host data path between storage devices 120 and host systems 112, through storage controller 102 and/or an alternative interface to fabric network 114.

Host systems 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 112 are sometimes called a host, client, or client system. In some embodiments, host systems 112 are server systems, such as a server system in a data center. In some embodiments, the one or more host systems 112 are one or more host devices distinct from a storage node housing the plurality of storage devices 120 and/or storage controller 102. In some embodiments, host systems 112 may include a plurality of host systems owned, operated, and/or hosting applications belonging to a plurality of entities and supporting one or more quality of service (QOS) standards for those entities and their applications. Host systems 112 may be configured to store and access data in the plurality of storage devices 120 in a multi-tenant configuration with shared storage resource pools accessed through namespaces and corresponding host connections to those host connections.

Host systems 112 may include one or more central processing units (CPUs) or host processors 112.1 for executing compute operations, storage management operations, and/or instructions for accessing storage devices 120, such as storage commands, through fabric network 114. Host systems 112 may include host memories 116 for storing instructions for execution by host processors 112.1, such as dynamic random access memory (DRAM) devices to provide operating memory for host systems 112. Host memories 116 may include any combination of volatile and non-volatile memory devices for supporting the operations of host systems 112. In some configurations, each host memory 116 may include a host file system 116.1 for managing host data storage to non-volatile memory. Host file system 116.1 may be configured in one or more volumes and corresponding data units, such as files, data blocks, and/or data objects, with known capacities and data sizes. Host file system 116.1 may use at least one storage driver 118 to access storage resources. In some configurations, those storage resources may include both local non-volatile memory devices in host system 112 and host data stored in remote data storage devices, such as storage devices 120, that are accessed using a direct memory access storage protocol, such as NVMe. In some configurations, each host memory 116 may include a QoS configuration for the storage resources mapped to file system 116.1. For example, based on the applications running on hosts 112 and corresponding storage processing needs, each host namespace mapped to file system 116.1 may have a corresponding processing speed threshold, such as input/output per second (IOPS) or megabyte per second (MBPS), in QoS configuration 116.2 that should be maintained by storage system 100 for that host namespace.

Storage driver 118 may be instantiated in the kernel layer of the host operating system for host systems 112. Storage driver 118 may support one or more storage protocols 118.1 for interfacing with data storage devices, such as storage devices 120. Storage driver 118 may rely on one or more interface standards, such as PCIe, ethernet, fibre channel, etc., to provide physical and transport connection through fabric network 114 to storage devices 120 and use a storage protocol over those standard connections to store and access host data stored in storage devices 120. In some configurations, storage protocol 118.1 may be based on defining fixed capacity namespaces on storage devices 120 that are accessed through dynamic host connections that are attached to the host system according to the protocol. For example, host connections may be requested by host systems 112 for accessing a namespace using queue pairs allocated in a host memory buffer and supported by a storage device instantiating that namespace. Storage devices 120 may be configured to support a predefined maximum number of namespaces and a predefined maximum number of host connections. When a namespace is created, it is defined with an initial allocated capacity value and that capacity value is provided to host systems 112 for use in defining the corresponding capacity in file system 116.1. In some configurations, storage driver 118 may include or access a namespace map 118.2 for all of the namespaces available to and/or attached to that host system. Namespace map 118.2 may include entries mapping the connected namespaces, their capacities, and host LBAs to corresponding file system volumes and/or data units. These namespace attributes 118.3 may be used by storage driver 118 to store and access host data on behalf of host systems 112 and may be selectively provided to file system 116.1 through a file system interface 118.5 to manage the block layer storage capacity and its availability for host applications.

Because namespace sizes or capacities are generally regarded as fixed once they are created, a block layer filter 118.4 may be used between the storage device/namespace interface of storage protocol 118.1 and file system interface 118.5 to manage dynamic changes in namespace capacity. Block layer filter 118.4 may be configured to receive a notification from storage devices 120 and/or storage controller 102 and provide the interface to support host file system resizing. Block layer filter 118.4 may be a thin layer residing in the kernel space as a storage driver module. Block layer filter 118.4 may monitor for asynchronous commands from the storage node (using the storage protocol) that include a namespace capacity change notification. Once an async command with the namespace capacity change notification is received by block layer filter 118.4, it may parse a capacity change value and/or an updated namespace capacity value from the notification and generate a resize command to host file system 116.1. Based on the resize command, file system 116.1 may adjust the capacity of the volume mapped to that namespace. Block layer filter 118.4 may also update namespace attributes 118.3 and namespace map 118.2, as appropriate.

Storage controller 102 may include one or more central processing units (CPUs) or processors 104 for executing compute operations, storage management operations, and/or instructions for accessing storage devices 120 through storage interface bus 108. In some embodiments, processors 104 may include a plurality of processor cores which may be assigned or allocated to parallel processing tasks and/or processing threads for different storage operations and/or host storage connections. In some embodiments, processor 104 may be configured to execute fabric interface for communications through fabric network 114 and/or storage interface protocols for communication through storage interface bus 108 and/or control bus 110. In some embodiments, a separate network interface unit and/or storage interface unit (not shown) may provide the network interface protocol and/or storage interface protocol and related processor and memory resources.

Storage controller 102 may include a memory 106 configured to support a plurality of queue pairs allocated between host systems 112 and storage devices 120 to manage command queues and storage queues for host storage operations against host data in storage devices 120. In some configurations, some or all of those host command queues or queue pairs may be virtualized through indirection provided by connection virtualization logic, resulting in virtual queues 106.1. For example, virtual queues 106.1 may receive host connections to a defined host namespace and host connection identifier, but dynamically allocate backend storage connections for greater flexibility in allocating host storage commands to storage devices and command queues with greater available processing capacity to prevent queue overflow and provide load balancing. In some configurations, memory 106 may include a QoS manager 106.2 configured to manage allocation and priority of host storage commands to assist in meeting the requirements of QoS configuration 116.2. In some embodiments, memory 106 may include one or more DRAM devices for use by storage devices 120 for command, management parameter, and/or host data storage and transfer. In some embodiments, storage devices 120 may be configured for direct memory access (DMA), such as using RDMA protocols, over storage interface bus 108.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2A:
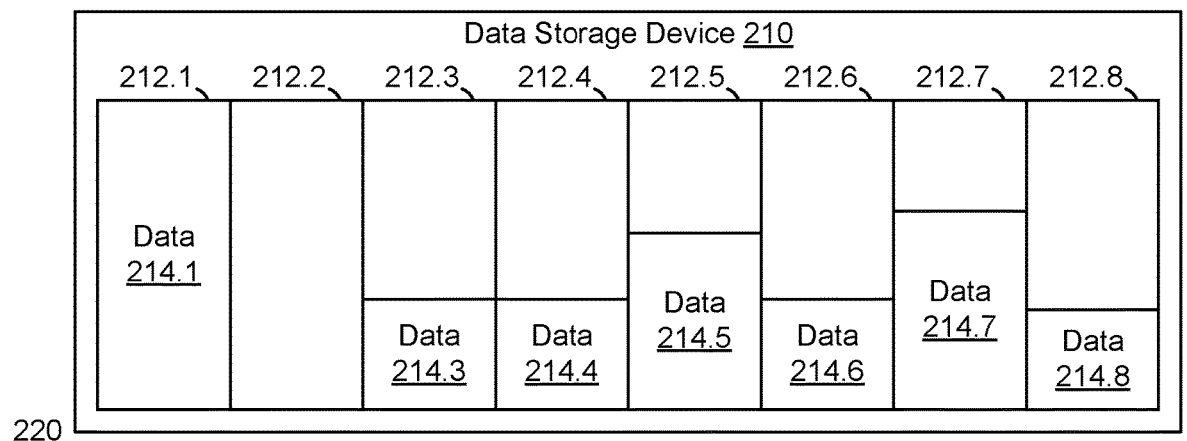
FIG. 2a schematically illustrates namespaces with different operating characteristics in a data storage device.
Figure 2B:
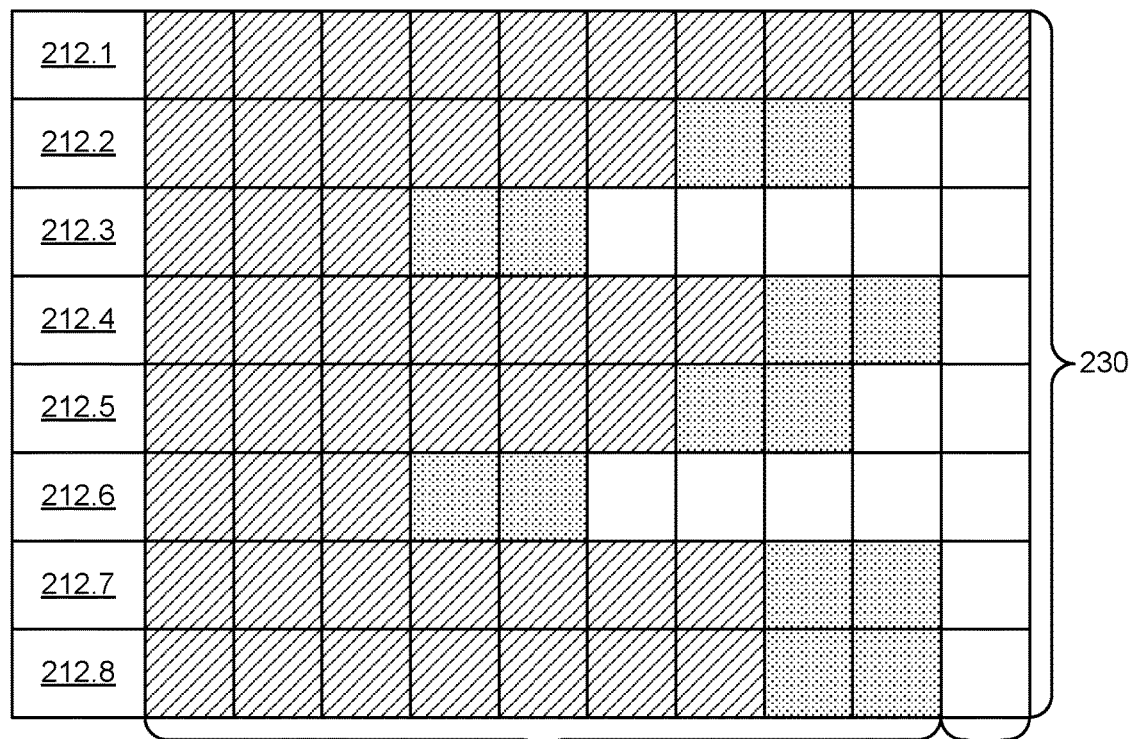
FIG. 2b schematically illustrates namespace allocations with contributions to a floating namespace pool.

FIGS. 2a and 2b show schematic representations of how the namespaces 212 in an example data storage device 210, such as one of storage devices 120 in FIG. 1, may be used by the corresponding host systems and support dynamic capacity allocation. FIG. 2a shows a snapshot of storage space usage and operating types for namespaces 212. FIG. 2b shows the current capacity allocations for those namespaces, supporting a number of capacity units contributing to a floating namespace pool.

In the example shown, storage device 210 has been allocated across eight namespaces 212.1-212.8 having equal initial capacities. For example, storage device 210 may have a total capacity of 8 terabytes (TB) and each namespace may be created with an initial capacity of 1 TB. Namespace 212.1 may have used all of its allocated capacity, the filled mark for host data 214.1 at 1 TB. Namespace 212.2 may be empty or contain an amount of host data too small to represent in the figure, such as 10 gigabytes (GB). Namespaces 212.3-212.8 are shown with varying levels of corresponding host data 214.3-214.8 stored in memory locations allocated to those namespaces, representing different current filled marks for those namespaces.

Additionally, the use of each namespace may vary on other operating parameters. For example, most of the namespaces may operate with an average or medium fill rate 222, relative to each other and/or system or drive populations generally. However, two namespaces 212.3 and 212.4 may be exhibiting significant variances from the medium range. For example, namespace 212.3 may be exhibiting a high fill rate 222.3 that is over a high fill rate threshold (filling very quickly) and namespace 212.4 may be exhibiting a low fill rate 222.4 that is below a low fill rate threshold (filling very slowly). Similarly, when compared according to input/output operations per second (IOPS) 224, most of namespaces 212 may be in a medium range, but two namespaces 212.5 and 212.6 may be exhibiting significant variances from the medium range for IOPS. For example, namespace 224.5 may be exhibiting high IOPS 224.5 (e.g., 1.2 GB per second) that is above a high IOPS threshold and namespace 212.6 may be exhibiting low IOPS 224.6 (e.g., 150 megabytes (MB) per second) that is below a low IOPS threshold. When compared according to whether read operations or write operations are dominant (R/W 226), most namespaces 212 may be in a range with relatively balanced read and write operations, but two namespaces 212.7 and 212.8 may be exhibiting significant variances from the medium range for read/write operation balance. For example, namespace 212.6 may be exhibiting read intensive operations 226.7 that are above a read operation threshold and namespace 212.8 may be exhibiting write intensive operations 226.8 that are above a write operation threshold. Similar normal ranges, variances, and thresholds may be defined for other operating parameters of the namespaces, such as sequential versus random writes/reads, write amplification/endurance metrics, time-dependent storage operation patterns, etc. Any or all of these operating metrics may contribute to operating types for managing allocation of capacity to and from a floating namespace pool.

To improve utilization of namespaces, each namespace may be identified as to whether they are able to contribute unutilized capacity to a floating capacity pool to reduce capacity starvation of namespaces with higher utilization. For example, a system administrator may set one or more flags when each namespace is created to determine whether it will participate in dynamic capacity allocation and, if so, how. Floating capacity for namespaces may consist of unused space from read-intensive namespaces and/or slow filling namespaces, along with unallocated memory locations from NVM sets and/or NVM endurance groups supported by the storage protocol. The floating capacity may not be exposed to or attached to any host, but maintained as a free pool stack of unused space, referred to as a floating namespace pool, from which the capacity can be dynamically allocated to expand any starving namespace.

In the example shown in FIG. 2B, each namespace 212 has been configured with an initial allocated capacity of ten capacity units 230. For example, if each namespace is allocated 1 TB of memory locations, each capacity unit would be 100 GB of memory locations. Namespaces 212, other than namespace 212.1, have been configured to support a floating namespace pool (comprised of the white capacity unit blocks). Each namespace includes a guaranteed capacity 232 and most of the namespaces include flexible capacity 236. In some configurations, guaranteed capacity 232 may include a buffer capacity 234 above a current or expected capacity usage. For example, capacity units 230 with diagonal lines may represent utilized or expected capacity, capacity units 230 with dots may represent buffer capacity, and capacity units 230 with no pattern may be available in the floating namespace pool. Guaranteed capacity 232 may be the sum of utilized or expected capacity and the buffer capacity. The floating namespace pool may be comprised of the flexible capacity units from all of the namespaces and provide an aggregate pool capacity that is the sum of those capacity units. For example, the floating namespace pool may include two capacity units from namespaces 212.2 and 212.5, five capacity units from namespaces 212.3 and 212.6, and one capacity unit from namespaces 212.4, 212,7 and 212.8, for an aggregate pool capacity of 17 capacity units. The allocations may change over time as capacity blocks from the floating namespace pool are used to expand the guaranteed capacity of namespaces that need it. For example, as fast filling namespace 212.3 receives more host data, capacity units may be allocated from the floating namespace pool to the guaranteed capacity needed for the host storage operations. The capacity may initially be claimed from the floating capacity blocks normally allocated to namespace 212.3, but may ultimately require capacity blocks from other namespaces, resulting in a guaranteed capacity larger than the initial 10 capacity units.

As described below, initial values for guaranteed storage and contributions to flexible capacity may be determined when each namespace is created. Some namespaces, such as namespace 212.1, may not participate in the floating namespace pool at all and may be configured entirely with guaranteed capacity, similar to prior namespace configurations. This may allow some namespaces to opt out of the dynamic allocation and provide guaranteed capacity for critical applications and host data. Some namespaces may use a system default for guaranteed and flexible capacity values. For example, the system may be configured to allocate a default portion of the allocated capacity to guaranteed capacity and a remaining portion to flexible capacity. In one configuration, the default guaranteed capacity may be 50% and the default flexible capacity may be 50%. So, for namespaces with the default configuration, such as namespaces 212.3 and 212.6, the initial guaranteed capacity value may be 5 capacity units and the flexible capacity value may be 5 capacity units. Some namespaces may use custom allocations of guaranteed and flexible capacity. For example, during namespace creation, the new namespace command may include custom capacity attributes to allow custom guaranteed capacity values and corresponding custom flexible capacity values. In the example shown, the remaining namespaces may have been configured with custom capacity attributes resulting in, for example, namespaces 212.2 and 212.5 having guaranteed capacity values of 8 capacity units and flexible capacity values of 2 capacity units. Additionally (as further described below), the guaranteed capacity values may change from the initial values over time as additional guaranteed capacity is allocated to namespaces that need it.

Figure 3:
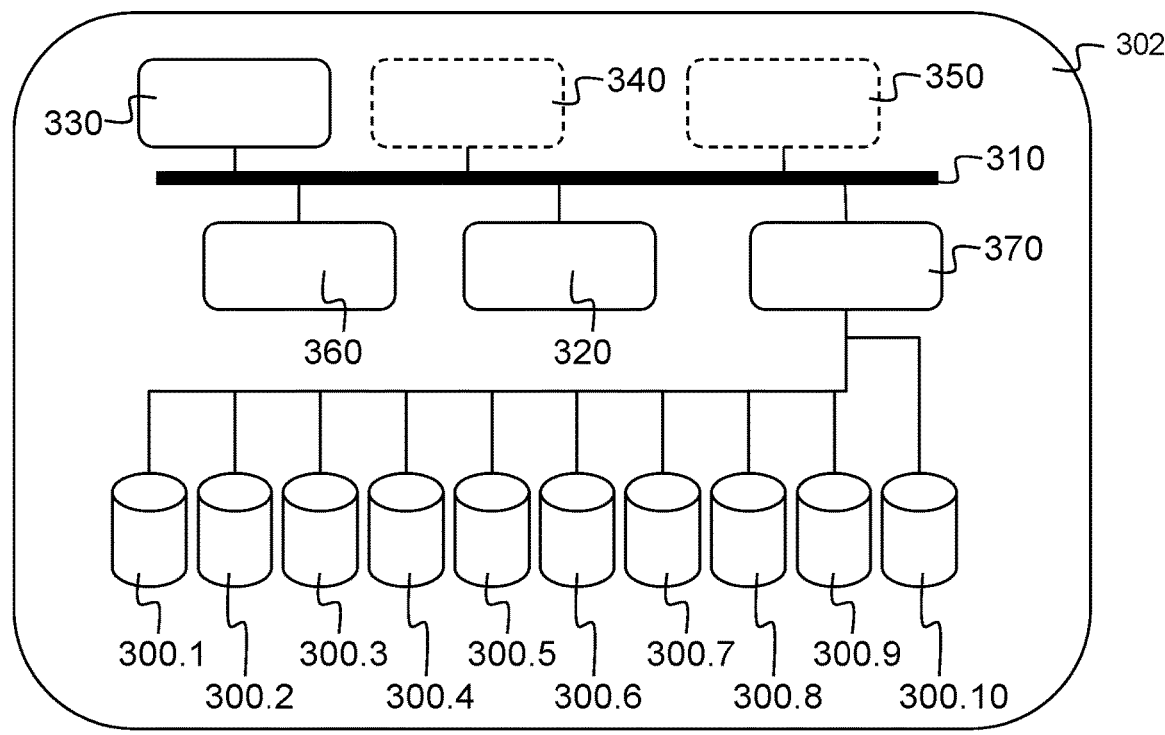
FIG. 3 schematically illustrates a storage node of the multi-device storage system of FIG. 1.

FIG. 3 shows a schematic representation of a storage node 302. For example, storage controller 102 may be configured as a storage node 302 for accessing storage devices 120 as storage elements 300. Storage node 302 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller, such as storage controller 102. Bus 310 may include one or more conductors that permit communication among the components of storage node 302. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 302 to communicate with other devices and/or systems, for example mechanisms for communicating with other storage nodes 302 or host systems 112. Storage element interface 370 may comprise a storage interface, such as a Serial Advanced Technology Attachment (SATA) interface, a Small Computer System Interface (SCSI), PCIe, etc., for connecting bus 310 to one or more storage elements 300, such as one or more storage devices 120, for example, 2 terabyte SATA-II disk drives or 2 TB NVMe solid state drives (SSDs), and control the reading and writing of data to/from these storage elements 300. As shown in FIG. 3, such a storage node 302 could comprise ten 2 TB NVMe SSDs as storage elements 300.1-300.10 and in this way storage node 302 would provide a storage capacity of 20 TB to the storage system 100.

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
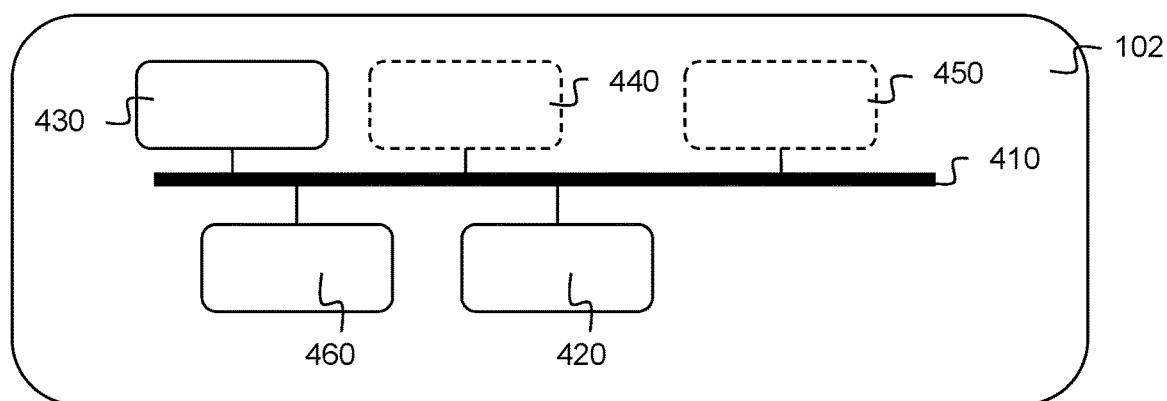
FIG. 4 schematically illustrates a host node of the multi-device storage system of FIG. 1.

FIG. 4 shows a schematic representation of an example host system 112. Host system 112 may comprise a bus 410, a processor 420, a local memory 430, one or more optional input units 440, one or more optional output units 450, and a communication interface 460. Bus 410 may include one or more conductors that permit communication among the components of host 112. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 112 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 112 to communicate with other devices and/or systems.

Figure 5:
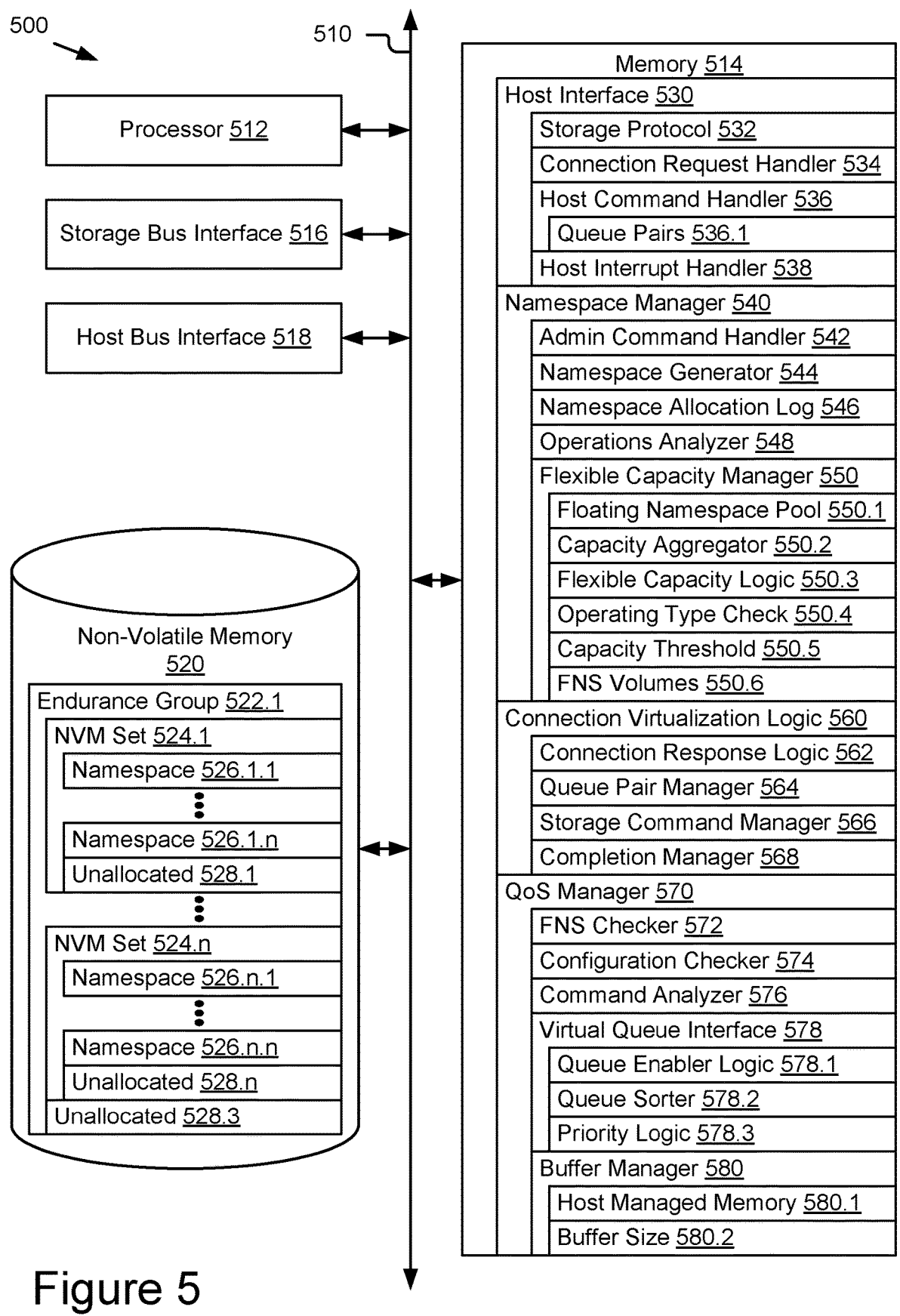
FIG. 5 schematically illustrates some elements of the storage node of FIG. 1-3 in more detail.

FIG. 5 schematically shows selected modules of a storage node 500 configured for dynamic allocation of namespace capacity using a floating namespace pool that provides additional options for managing quality of service. Storage node 500 may incorporate elements and configurations similar to those shown in FIGS. 1-3. For example, storage node 500 may be configured as storage controller 102 and a plurality of storage devices 120 supporting host connection requests and storage operations from host systems 112 over fabric network 114. In some embodiments, the functions of host interface 530, namespace manager 540, and non-volatile memory 520 may all be instantiated in a single data storage device, such as one of data storage devices 120.

Storage node 500 may include a bus 510 interconnecting at least one processor 512, at least one memory 514, and at least one interface, such as storage bus interface 516 and host bus interface 518. Bus 510 may include one or more conductors that permit communication among the components of storage node 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage bus interface 516 may include a physical interface for connecting to one or more data storage devices using an interface protocol that supports storage device access. For example, storage bus interface 516 may include a PCIe or similar storage interface connector supporting NVMe access to solid state media comprising non-volatile memory devices 520. Host bus interface 518 may include a physical interface for connecting to one or more host nodes, generally via a network interface. For example. host bus interface 518 may include an ethernet connection to a host bus adapter, network interface, or similar network interface connector supporting NVMe host connection protocols, such as RDMA and transmission control protocol/internet protocol (TCP/IP) connections. In some embodiments, host bus interface 518 may support NVMeoF or similar storage interface protocols.

Storage node 500 may include one or more non-volatile memory devices 520 or similar storage elements configured to store host data. For example, non-volatile memory devices 520 may include at least one SSD and/or a plurality of SSDs or flash memory packages organized as an addressable memory array. In some embodiments, non-volatile memory devices 520 may include NAND or NOR flash memory devices comprised of single level cells (SLC), multiple level cell (MLC), triple-level cells, quad-level cells, etc. Host data in non-volatile memory devices 520 may be organized according to a direct memory access storage protocol, such as NVMe, to support host systems storing and accessing data through logical host connections. Non-volatile memory devices 520, such as the non-volatile memory devices of an SSD, may be allocated to a plurality of namespaces 526 that may then be attached to one or more host systems for host data storage and access. Namespaces 526 may be created with allocated capacities based on the number of namespaces and host connections supported by the storage device. In some configurations, namespaces may be grouped in non-volatile memory sets 524 and/or endurance groups 522. These groupings may be configured for the storage device based on the physical configuration of non-volatile memory devices 520 to support efficient allocation and use of memory locations. These groupings may also be hierarchically organized as show, with endurance groups 522 including NVM sets 524 that include namespaces 526. In some configurations, endurance groups 522 and/or NVM sets 524 may be defined to include unallocated capacity 528, such as memory locations in the endurance group or NVM set memory devices that are not yet allocated to namespaces to receive host data. For example, endurance group 522 may include NVM sets 524.1-524.*n* and may also include unallocated capacity 528.3. NVM sets 524.1-524.*n* may include namespaces 526.1.1-526.1.*n* to 526.*n*.1-526.*n*.*n* and unallocated capacity 528.1 and 528.*n*.

Storage node 500 may include a plurality of modules or subsystems that are stored and/or instantiated in memory 514 for execution by processor 512 as instructions or operations. For example, memory 514 may include a host interface 530 configured to receive, process, and respond to host connection and data requests from client or host systems. Memory 514 may include a namespace manager 540 configured to manage the creation and capacity of namespaces using a floating namespace pool. Memory 514 may include connection virtualization logic 560 for providing indirection between host connection identifiers and backend storage device queues for host storage commands to namespaces. Memory 514 may include QoS manager 570 for implementing one or more QoS improvements to accelerate processing of host storage commands.

Host interface 530 may include an interface protocol and/or set of functions and parameters for receiving, parsing, responding to, and otherwise managing requests from host nodes or systems. For example, host interface 530 may include functions for receiving and processing host requests for establishing host connections with one or more namespaces stored in non-volatile memory 520 for reading, writing, modifying, or otherwise manipulating data blocks and their respective client or host data and/or metadata in accordance with host communication and storage protocols. In some embodiments, host interface 530 may enable direct memory access and/or access over NVMeoF protocols, such as RDMA and TCP/IP access, through host bus interface 518 and storage bus interface 516 to host data units stored in non-volatile memory devices 520. For example, host interface 530 may include host communication protocols compatible with ethernet and/or another host interface that supports use of NVMe and/or RDMA protocols for data access to host data in namespaces 526. Host interface 530 may be configured for interaction with a storage driver of the host systems and enable non-volatile memory devices 520 to be directly accessed as if they were local storage within the host systems. For example, connected namespaces in non-volatile memory devices 520 may appear as storage capacity within the host file system and defined volumes and data units managed by the host file system.

In some embodiments, host interface 530 may include a plurality of hardware and/or software modules configured to use processor 512 and memory 514 to handle or manage defined operations of host interface 530. For example, host interface 530 may include a storage protocol 532 configured to comply with the physical, transport, and storage application protocols supported by the host for communication over host bus interface 518 and/or storage bus interface 516. For example, host interface 530 may include a connection request handler 534 configured to receive and respond to host connection requests. For example, host interface 530 may include a host command handler 536 configured to receive host storage commands to a particular host connection. For example, host interface 530 may include a host interrupt handler configured to provide interrupt commands to the host systems. In some embodiments, host interface 530 may include additional modules (not shown) for command handling, buffer management, storage device management and reporting, and other host-side functions.

In some embodiments, storage protocol 532 may include both PCIe and NVMe compliant communication, command, and syntax functions, procedures, and data structures. In some embodiments, storage protocol 532 may include an NVMeoF or similar protocol supporting RDMA, TCP/IP, and/or other connections for communication between host nodes and target host data in non-volatile memory 520, such as namespaces attached to the particular host by at least one host connection. Storage protocol 532 may include interface definitions for receiving host connection requests and storage commands from the fabric network, as well as for providing responses to those requests and commands. In some embodiments, storage protocol 532 may assure that host interface 530 is compliant with host request, command, and response syntax while the backend of host interface 530 may be configured to interface with connection namespace manager 540 to provide dynamic allocation of capacity among namespaces.

Connection request handler 534 may include interfaces, functions, parameters, and/or data structures for receiving host connection requests in accordance with storage interface protocol 532, determining an available processing queue, such as a queue-pair, allocating the host connection (and corresponding host connection identifier) to a storage device processing queue, and providing a response to the host, such as confirmation of the host storage connection or an error reporting that no processing queues are available. For example, connection request handler 534 may receive a storage connection request for a target namespace in a NVMe-oF storage array and provide an appropriate namespace storage connection and host response. In some embodiments, connection request handler 534 may interface with namespace manager 540 to update host connection log 552 for new host connections. For example, connection request handler 534 may generate entries in a connection log table or similar data structure indexed by host connection identifiers and including corresponding namespace and other information.

In some embodiments, host command handler 536 may include interfaces, functions, parameters, and/or data structures to provide a function similar to connection request handler 534 for storage requests directed to the host storage connections allocated through connection request handler 534. For example, once a host storage connection for a given namespace and host connection identifier is allocated to a storage device queue-pair, the host may send any number of storage commands targeting data stored in that namespace. Host command handler 536 may maintain queue pairs 336.1 that include a command submission queue for storage commands going to non-volatile memory devices 520 and a response or completion queue for responses indicating command state and/or returned host data locations, such as read data written to the corresponding host memory buffer for access by the host systems. Receipt of a host storage command may trigger a submission queue entry for that command that may trigger determination of where the command will be allocated among available backend queue pairs. In some configurations, host command handler 536 passes host storage commands to the storage device command queues and corresponding NVM device manager (not shown) for executing host data operations related to host storage commands received through host interface 530 once a host connection is established. For example, PUT or Write commands may be configured to write host data units to non-volatile memory devices 520. GET or Read commands may be configured to read data from non-volatile memory devices 520. DELETE or Flush commands may be configured to delete data from non-volatile memory devices 520, or at least mark a data location for deletion until a future garbage collection or similar operation actually deletes the data or reallocates the physical storage location to another purpose.

In some embodiments, host interrupt handler 538 may include interfaces, functions, parameters, and/or data structures to enable storage node 500 to communicate with the host systems outside of the storage commands and responses supported by host command handler 536. For example, host interrupt handler 538 may respond to storage device states and events to provide interrupt commands to the host systems through storage protocol 532 and a storage driver of the host systems. In some embodiments, namespace manager 540 may generate one or more notification events and pass handling of those notification events to host interrupt handler 538. For example, when the guaranteed capacity of a namespace changes, a capacity change notification 538.1 may be sent to the connected host system for that namespace as an interrupt command. As another example, when a floating namespace capacity threshold is reached and indicates that the storage device is low on floating namespace capacity, a capacity needed notification 538.2 may be sent to the host systems and/or a storage system administrator to indicate that a new storage device should be added (or other system level configuration changes should be made) to assure continued available capacity for the host applications.

Namespace manager 540 may include an interface protocol and/or set of functions, parameters, and data structures for defining new namespaces in non-volatile memory devices 520 and managing changes in capacity using a floating namespace pool. For example, namespace manager 540 may receive new namespace requests for a data storage device to allocate the capacity of that storage device among a set of namespaces with allocated capacities of a defined capacity value, such as dividing the 8 TB capacity of a storage device among eight different namespaces. Namespace manager 540 may process command parameters and/or configuration settings for the new namespaces to determine whether and how each namespace supports the floating namespace pool for flexible capacity. For example, each namespace request may include one or more request parameters corresponding to enabling flexible capacity and defining the guaranteed and flexible capacity allocations for that namespace. Once the namespace capacity allocations are defined, namespace manager 540 may monitor and algorithmically and automatically adjust capacity allocations of the set of namespaces by reallocating capacity units from the floating namespace pool to namespaces that need additional capacity. Namespace manager 540 may also send, in cooperation with host interface 530, notifications to host and/or administrative systems as namespace capacities change and/or more capacity is needed.

In some embodiments, namespace manager 540 may include a plurality of hardware and/or software modules configured to use processor 512 and memory 514 to handle or manage defined operations of namespace manager 540. For example, namespace manager 540 may include and/or access an administrative command handler 542 configured to communicate with an administrator system for namespace requests, configuration, and administrative notifications. For example, namespace manager 540 may include and/or access a namespace generator 544 configured to allocate namespaces on non-volatile memory devices 520 in response to namespace requests received through host interface 530 and/or administrative command handler 542. For example, namespace manager 540 may include and/or access a namespace allocation log 546 configured to record and maintain capacity allocations for the namespaces and floating namespace pool. For example, namespace manager 540 may include and/or access an operations analyzer configured to determine operating characteristics of the namespaces. For example, namespace manager 540 may include and/or access a flexible capacity manager 550 configured to manage the floating namespace pool and capacity changes for the namespaces.

Administrative command handler 542 may include interfaces, functions, parameters, and/or data structures to interact with an administrative system used to provision and configure namespaces for use by the host systems. For example, one or more host systems and/or a dedicated administrative system may include an administrative user interface for configuring and monitoring the storage system including storage node 500. Administrative command handler 542 may provide an interface for receiving administrative commands, such as new namespace, NVM set, and/or endurance group requests, for namespace manager 540. In some embodiments, administrative command handler 542 may receive namespace requests and parse a set of namespace parameters related to the request for use by namespace generator 544. For example, administrative command handler may determine the request type and parse request parameters corresponding to namespace capacity allocation, enabling flexible capacity, and/or guaranteed capacity allocation. In some embodiments, storage protocol 532 may define the administrative commands and predetermined locations within those commands for the request parameters used by namespace generator 544.

Namespace generator 544 may include interfaces, functions, parameters, and/or data structures to allocate and configure new namespaces for non-volatile memory devices 520. For example, when a new storage device is added to storage node 500, the storage device may have a storage device configuration that determines a total available capacity and a number of namespaces that can be supported by the device. Namespace generator 544 may receive new namespace request parameters from administrative command handler 542 and use them to configure each new namespace in the new storage device. In some embodiments, namespace generator 544 may determine a capacity allocation for the namespace. For example, the namespace request may include a capacity allocation value for the new namespace based on how the system administrator intends to allocate the memory space in the storage device's non-volatile memory devices, such as dividing the memory locations equally among a number of namespaces or individually allocating different allocated capacities to each namespace. Once capacity allocation is determined, a set of memory locations in non-volatile memory devices 520 meeting the capacity allocation may be associated with the namespace. In some configurations, the namespace may be associated with an NVM set and/or endurance group and the memory locations may be selected from the set of memory locations previously assigned to the corresponding NVM set and/or endurance group.

Namespace generator 544 may include initial capacity logic for determining whether a new namespace is participating in the flexible capacity feature of the storage device and make the initial allocations of guaranteed capacity and flexible capacity. The initial capacity logic may use request parameter values related to the namespace creation request to determine the initial capacities and how they are allocated between guaranteed and flexible capacity. One or more flexible capacity flags may determine whether or not the namespace will participate in the floating namespace pool and dynamic capacity allocation. For example, the namespace request may include a flexible capacity flag in a predetermined location in the request message and the value of the flag may be parsed by admin command handler 542 and passed to namespace generator 544. Where the namespace is part of an NVM set and/or endurance group, initial capacity logic may check flag values related to the NVM set and/or endurance group to see whether flexible capacity is enabled. In some configurations, these parameters may also determine whether unallocated capacity from the NVM set and/or endurance group may be used to support the floating capacity pool (in addition to the flexible capacity from each participating namespace).

Once a namespace is determined to participate in the flexible capacity and floating namespace pool, initial capacity logic may determine initial values for the guaranteed capacity and the flexible capacity of the namespace. For example, the allocated capacity may be divided between a guaranteed capacity value and a flexible capacity value, where the sum of those values equals the allocated capacity value for the namespace. In some embodiments, each namespace that is not being enabled for flexible capacity may treat its entire capacity allocation as guaranteed capacity. For example, 1 TB namespace would have a guaranteed capacity of 1 TB (all capacity units in the namespace) and a flexible capacity of zero. In some embodiments, initial capacity logic may use custom capacity attribute and/or default capacity values to determine the initial capacity values. In some embodiments, the default capacity values may include a plurality of guaranteed/flexible capacity values that are mapped to different operating types, as described below for operations analyzer 548, and may receive an operating type used as a key for indexing the default values, such as from operations analyzer 548 or from an operating type parameter configured in the namespace request. Namespace generator 544 may determine a set of namespace attributes for the new namespace, including the initial guaranteed and flexible capacity values, and provide those namespace attributes to other components, such as a namespace directory used by host systems to connect to the new namespace and/or namespace allocation log 546.

Namespace allocation log 546 may include interfaces, functions, parameters, and/or data structures to store the initial capacity allocation values for new namespaces and manage changes to those values during flexible capacity operations. For example, namespace allocation log 546 may include a data structure or algorithm for indicating the memory locations corresponding to capacity allocations. Memory allocations in namespace allocation log 546 may indicate the specific sets of memory locations in non-volatile memory 520 and whether they are guaranteed capacity or flexible capacity for that namespace. As further described below, the memory locations may be reallocated in capacity units over time as the floating namespace pool is used to support expansion of the guaranteed capacity of the namespaces that need it. For example, namespace allocation log 546 may include a map or similar lookup table data structure or function for each namespace's memory allocation and which memory locations or capacity units are currently allocated as guaranteed capacity or flexible capacity.

Operations analyzer 548 may include interfaces, functions, parameters, and/or data structures to analyze the data storage operations, including host data and command types and patterns, for determining how a namespace is being used. For example, operations analyzer 548 may analyze a set of host operations to the namespace to determine whether the namespace is slow filling, fast filling, or within a normal or medium fill range. Operating types for the namespaces may be used by flexible capacity manager 550 to determine when and whether namespaces should be allocated additional guaranteed capacity from the floating namespace pool and which namespaces should provide the additional capacity from their flexible capacity. In some embodiments, operations analyzer 548 may include or access a dataset management function or service of storage node 500 and/or the specific storage device for determining one or more operating parameters of the namespace. For example, the dataset management function may be configured to process transaction logs to monitor operating parameters, such as read operations, write operations, operations per unit time, memory/capacity usage, endurance metrics, etc. In some embodiments, operations analyzer 548 may determine operating parameters for fill rate, read versus write (e.g., percentage of read commands versus write commands), IOPS, and the current used capacity of the namespace (e.g., a filled mark corresponding to the memory locations and/or capacity units in the namespace currently storing host data). In some embodiments, operations analyzer 548 may use the operating parameters to classify each namespace into one or more operating types, such as a fast filling type or a slow filling type, a high read type or a high write type, or a high performance type or a low performance type. For example, operations analyzer 548 may include operating type ranges that map operating parameter values to the operating types. In some embodiments, operating type ranges may define at least one operating parameter threshold value that, if met, defines the namespace as one type or another. For example, a fill rate threshold may define whether a fill rate value for the namespace is classified as a fast filling namespace or a slow filling namespace. In some embodiments, operating type ranges may define more than two types using multiple ranges and thresholds, such high, medium/normal, and low types. In some embodiments, operating type ranges may include mapping multiple operating parameters to one or more operating types. For example, whether a namespace is classified as fast filling or slow filling may be based on mapping read versus write, IOPS, and change rates for a filled mark using weighted factors for each operating parameter to determine a composite fill rate value and corresponding fill rate type.

Flexible capacity manager 550 may include interfaces, functions, parameters, and/or data structures to determine floating namespace pool 550.1 and allocate flexible capacity from the pool to namespaces that need it. For example, once the initial capacity values are determined for the set of namespaces in a storage device, flexible capacity manager 550 may monitor storage operations and/or operating parameters from operations analyzer 548 to determine when a namespace has exceeded or is approaching its guaranteed capacity and allocate additional capacity units to that namespace. Floating namespace pool 550.1 may include the plurality of capacity units allocated to flexible capacity for the set of namespaces. For example, flexible capacity manager 550 may include a capacity aggregator 550.2 that sums the capacity units in the flexible capacity portion of each namespace in the set of namespaces to determine the aggregate capacity of floating namespace pool 550.1. In some embodiments, flexible capacity manager 550 may also have access to unallocated capacity from other regions of non-volatile memory devices 520. For example, unallocated capacity may include some or all of the unallocated memory locations in one or more NVM sets and/or endurance groups may be selectively added to floating namespace pool 550.1. In this context, unallocated memory locations may be those memory locations that are associated with an NVM set and/or endurance group but are not allocated to a namespace within that NVM set and/or endurance group, such as unallocated memory 528.

Flexible capacity manager 550 may include flexible capacity logic 550.3 that monitors and responds to changes in the capacity used for host data in each namespace. For example, each time a storage operation is processed or on some other time interval or event basis, flexible capacity logic 550.3 may determine the filled mark for the target namespace for the storage operation and/or each namespace and evaluate the filled mark relative to the guaranteed capacity to determine whether additional capacity is needed by that namespace. In some embodiments, flexible capacity logic 550.3 may also include an operating type check 550.4 to determine one or more operating types for the namespace, such as operating types from operations analyzer 548, as a factor in determining whether additional capacity is need by that namespace and/or from which other namespace's flexible capacity the additional capacity should come from. For example, operating type check 550.4 may check whether the namespace is fast filling or slow filling for the purposes of determining when and whether to add guaranteed capacity and/or decrease flexible capacity for a namespace.

Flexible capacity manager 550 may use one or more capacity thresholds 550.5 for determining whether and when capacity should be added to a namespace. For example, flexible capacity manager 550 may use a flexible capacity threshold to evaluate the filled mark for the namespace to trigger the addition of capacity. In some embodiments, the flexible capacity threshold may be set at a portion of the guaranteed capacity, such 50%, 80%, or 90%, with the complementary portion corresponding to a buffer capacity in the guaranteed capacity. So, when the filled mark meets the flexible capacity threshold, such as X % of the guaranteed capacity (or guaranteed capacity—X, if X is a fixed buffer capacity), flexible capacity logic 550.3 selects at least one capacity unit from floating namespace pool 550.1 to expand the guaranteed capacity of that namespace. For example, a number of capacity units at least meeting a difference between the filled mark and capacity threshold 550.5 (the amount the filled mark is over the capacity threshold). In some embodiments, the flexible capacity thresholds may be based on amount of flexible capacity being used (i.e., the filled mark is allowed to exceed the guaranteed capacity until a threshold amount of flexible capacity is used). For example, the flexible capacity threshold may be set at 50% of the flexible capacity, so when the filled mark meets or exceeds guaranteed capacity+50% of flexible capacity, the addition of capacity may be triggered. Note that adding capacity units to the namespace increases the total capacity allocation for that namespace, adding new memory locations to memory allocations in namespace allocation log 546. As a result, guaranteed capacity and flexible capacity may also be recalculated by flexible capacity logic 550.3. For example, the number of added capacity units may be added to the guaranteed capacity (and the flexible capacity may remain unchanged). In some embodiments, guaranteed capacity may at least be increased to the current filled mark and/or filled mark plus buffer capacity.

In some embodiments, flexible capacity logic 550.3 may also determine which other namespace the capacity units from floating namespace pool 550.1 are moved from. For example, flexible capacity logic 550.3 may include a guaranteed capacity threshold compared to the filled mark of the source namespace and an operating type of the source namespace to determine whether the capacity units can be spared. In some configurations, flexible capacity logic 550.3 may organize floating namespace pool 550.1 into a prioritized stack of capacity units from the different namespaces and, in some cases, may include unallocated capacity. Flexible capacity logic 550.3 may select the next capacity unit from the stack to provide needed capacity to a target namespace. Additional aspects of flexible capacity logic 550.3 may be described with regard to the methods and examples below.

In some embodiments, flexible capacity logic 550.3 may include one or more thresholds or events that trigger notifications to other systems. For example, when a namespace (total) capacity allocation is changed because capacity units have been added or removed, a capacity change notification should be sent to connected host systems. As another example, an aggregate capacity threshold may be evaluated against the capacity units remaining in floating namespace pool 550.1 to determine when a host system and/or administrative system should be notified that more capacity is need for storage node 500 and additional storage units should be added. Flexible capacity manager 550 may include a notification interface for passing notification requests to admin command handler 542 and/or host interrupt handler 538. For example, each time capacity units are moved from a source namespace to a target namespace, one or more capacity change notification may be generated to invoke command interrupts to the effected host systems.

In some configurations, flexible capacity manager 550 may be configured to allocate floating namespace pool 550.1 across a plurality of floating namespace volumes 550.6. For example, floating namespace pool 550.1 may be used to support virtual namespaces allocated from the unused capacity in floating namespace pool 550.1. In some configurations, after capacity aggregator 550.2 has determined the total capacity of floating namespace pool 550.1, a portion of the floating namespace pool that is unlikely to be needed to expand the previously defined host namespaces may be configured for other uses. For example, at least one floating namespace volume may be allocated for supporting flexible capacity logic 550.3 and additional volumes may be allocated using the additional capacity. Floating namespace volumes 550.6 may be used to define virtual namespaces that can be published and made available to hosts as additional namespaces to support host application or may be used to provide floating capacity to support QoS manager 570. For example, floating namespace volumes may be used to process host storage commands and, in some configurations, multiple floating namespace volumes may be used to support parallel host storage command queuing and processing through virtual queues and virtual channels.

Connection virtualization logic 560 may include interface protocols and a set of functions and parameters for providing a virtualization layer between host interface 530 and a storage interface to the storage devices and/or NVM controllers that process host storage commands. For example, connection virtualization logic 560 may operate in conjunction with connection request handler 534 to receive and resolve host connection requests and related storage commands by providing indirection and mapping between front-end queue-pairs and back-end queue-pairs. Connection virtualization logic 560 may include hardware and/or software modules configured to use processor 512 and memory 514 for executing specific functions of connection virtualization logic 560. In some embodiments, connection virtualization logic 560 may include connection response logic 562, queue pair manager 564, storage command manager 566, and completion manager 568.

Connection response logic 562 may include interfaces, functions, parameters, and/or data structures configured to determine a response to host connection requests in support of connection request handler 534. In some embodiments, connection response logic 562 may be called by or integrated with connection request handler 534. Connection response logic 562 may identify or determine a host connection identifier for managing unique host connections to namespaces in the storage devices. For example, connection response logic 562 may extract the host connection identifier from the host connection request and/or receive the host connection identifier from connection request handler 534 and/or connection log data. In some embodiments, connection response logic 562 may include autoresponder logic configured to override normal queue-pair limits and aggregate host connection counts. For example, the autoresponder logic may automatically respond through connection request handler 534 that host storage connections are available, even if the number of active host storage connections exceeds an aggregate queue-pair pool. In some embodiments, host connection identifiers may then be passed to queue pair manager 564 for further processing of host connection requests.

Queue pair manager 564 may include interfaces, functions, parameters, and/or data structures configured to manage allocations of host or front-end queue-pairs represented by host connection identifiers to storage device or back-end queue-pairs represented by completion connection identifiers. In some embodiments, queue pair manager 564 may receive or identify each connection request received from the hosts. For example, queue pair manager 564 may receive connection requests from connection request handler 534, connection response logic 562, and/or connection log data.

For each connection request, queue-pair manage may invoke completion identifier logic to assign a default host storage connection between the host connection identifier and a completion connection identifier for a target processing queue, such as a target queue-pair of a target storage device. For example, the completion identifier logic may be configured to generate and assign completion connection identifiers to target processing queues for use in allocating and managing back-end queue-pairs without relying on host connection identifiers. In some embodiments, queue pair manager 564 may include or access storage device identifiers and processing queue identifiers (e.g., queue-pair identifiers) that uniquely identify a specific storage device and processing queue of that storage device for assigning and storing completion connection identifiers. In some configurations, queue pair manager 564 may use virtual queues allocated to floating namespaces for allocating host connections and/or related host storage commands to provide additional processing bandwidth for QoS. For example, when one or more processing queues are full, virtual queues to the floating namespace pool may be used for backend storage command processing. In some configurations, virtual queue pairs and the virtual namespaces associated with them may be assigned to host connections like other host namespaces and storage device queue pairs. In some configurations, virtual queue pairs for one or more floating namespace volumes may be reserved for QoS processing as directed by QoS manager 570.

Storage command manager 566 may include interfaces, functions, parameters, and/or data structures configured to manage allocation of individual storage commands to the processing queues and their respective completion connection identifiers. For example, host command handler 536 may forward storage commands to storage command manager 566 to enable virtualization and dynamic allocation of storage commands to processing queues other than the default completion connection identifier assigned by queue pair manager 564. In some embodiments, queue selection logic may include logical rules for selecting the processing queue to which the incoming storage command is allocated. For example, queue selection logic may initially allocate storage commands to the default completion connection identifier and corresponding processing queue unless and until a queue full notification is received from that processing queue. Responsive to the queue full notification, queue selection logic may initiate queue overflow logic to evaluate other available processing queues that could receive and process the storage command. For example, queue overflow logic may evaluate other processing queues to the same storage device, determine which has the shortest queue depth of pending storage commands, and select that processing queue. In another example, queue overflow logic may evaluate all available processing queues across all storage devices. In still another example, queue overflow logic may initiate queue pair manager 564 to initiate a new processing queue and corresponding completion identifier to receive the storage command. In still another example, a virtual queue to a floating namespace volume may be provided by namespace manager 540 and/or QoS manager 570 and used to handle the storage command. Any of these actions may enable the storage command to be processed (and prevent or interrupt the return of a queue full error to the host system). In some embodiments, selection of processing queues for overflow storage commands may be based on a priority order among processing queues based on I/O usage, capacity, load balancing, wear, reliability (e.g., error rates, etc.), and/or other storage device or operational parameters. For example, processing queues may be prioritized or otherwise selected based on storage resource usage values from a storage resource monitor. In some embodiments, queue selection logic may be configured to evaluate processing queue priorities for incoming storage commands without first determining the default processing queue is full.

Once storage command manager 566 determines the processing queue and corresponding completion connection identifier for an incoming storage command, mapping of the storage command to host connection identifier and completion connection identifier may be stored by a command tracker. For example, the command tracker may store a storage command entry in a command tracker data log. In some embodiments, the command tracker may store command tracker entries in a data structure in the command tracker data log. For example, each entry may include a storage command identifier, a storage command type, a host connection identifier, and a completion connection identifier.

Completion manager 568 may include interfaces, functions, parameters, and/or data structures configured to manage handling the indirection of completion notifications from the storage devices to the corresponding hosts. For example, completion manager 568 may receive, through a completion monitor, storage device completion indicators for storage commands that have been processed and forward those completion indicators to the corresponding host completion queue through host command handler 536. In some embodiments, each storage device may return completion indicators to the completion monitor and, rather than forwarding the completion indicator to host command handler 536, the completion monitor may initiate completion manager 568 in order to determine which host completion queue the completion indicator should go to. In some embodiments, completion manager 568 may determine the return path for the storage command using a command tracker lookup. For example, the command tracker lookup may use the storage command identifier as an index to find the tracker entry for the storage command in command tracker data log. The tracker entry may include the host connection identifier from which the storage command was received which, in turn, determines the host completion queue for returning the completion indicator to the correct host through the correct host queue pair. In some embodiments, completion manager 568 may be configured to replace the completion connection identifier with the host connection identifier in the message parameters for routing the completion indicator to the corresponding host completion queue.

Quality of service manager 570 may include interface protocols and a set of functions, data structures, and parameters for improving quality of service by managing processing to floating namespace pool 550.1. For example, QoS manager 570 may use virtual queues to floating namespaces and sort those queues to maximize the impact of the processing by handling host storage commands with larger payload sizes first. QoS manager 570 may be configured to manage namespaces based on bandwidth segregation to identify namespace operating types, such as fast filling, slow filling, read intensive, write intensive, etc. QoS manage may be configured to use data storage device characteristics and configurations and host command segregation at the protocol level, payload level, and/or enclosure level to improve QoS. QoS manager 570 may include hardware and/or software modules configured to use processor 512 and memory 514 for executing specific functions of QoS manager 570. In some embodiments, QoS manager 570 may include a floating namespace checker (FNS) checker 572, configuration checker 574, command analyzer 576, virtual queue interface 578, and buffer manager 580.

Floating namespace checker 572 may include interfaces, functions, parameters, and/or data structures configured to verify whether floating namespaces are enabled for a target data storage device, namespace, and/or endurance group or NVM set to which the namespace is assigned. For example, when namespace generator 544 allocates new namespaces for a host, whether or not the namespace participates in floating namespace pool 550.1 and/or flexible capacity allocation may ne included in the parameters of the command or determined by reference to configuration parameters at the host, storage system, data storage device, and/or namespace/NVM set/endurance group levels. Floating namespace checker 572 may be used by QoS manager 570 to determine whether to invoke one or more QoS management methods. Floating namespace enablement may be a prerequisite for the various QoS methods discussed herein.

Configuration checker 574 may include interfaces, functions, parameters, and/or data structures configured to check the configuration of the data storage device and/or other storage system components to determine support for one or more storage protocol features. For example, configuration checker 574 may check a generation of the data storage device and its NVMe support for features related to exposing memory capacity as host managed memory in a "separate" NVMe compatible device. In some configurations, a device generation value may determine the availability of one or more interface features for the data storage device. For example, a feature to expose capacity as a host-managed device memory with device coherent back validation (HDM-DB) may be selectively available for devices over a certain generation, such as generation 5. The virtual namespace pool and/or memory locations for a specific namespace volume may be exposed to the hosts as a type 3 compute express link (CXL) device that provides host managed device memory that acts as a memory expander for the host. The host may use the additional capacity for read/write operations that may be processed faster and support QoS storage processing targets using either physical region page (PRP) or scatter gather list (SGL) commands.

Command analyzer 576 may include interfaces, functions, parameters, and/or data structures configured to analyze incoming host storage commands to assist in accelerating the handling of those commands. For example, as host storage commands are received by host interface 530 as submission queue entries (SQEs), command analyzer 576 may determine one or more parameters of the command for use by QoS manager 570. In some configurations, command analyzer 576 may be configured to determine whether a command is a PRP or SGL command. For example, command analyzer 576 may check a PRP or SGL data transfer (PSDT) frame or field in the host storage command to determine whether PRP or SGL is being used. The PSDT settings may be used to determine whether the data is physically continuous (PC), with PRP being physically continuous (PC value=1) and SGL not being physically continuous (PC value=0). In some configurations, command analyzer 576 may be configured to calculate a payload size for each command. For example, page or block size may be used for PRP commands to determine the command payload size and/or the list references in the SGL commands may be aggregated to determine the command payload size.

Virtual queue interface 578 may include interfaces, functions, parameters, and/or data structures configured to selectively enable virtual queues and/or corresponding virtual interfaces or virtual channels. For example, virtual queue interface 578 may operate in conjunction with connection virtualization logic 560 and/or host interface 530 to allocate virtual queues for receiving host storage commands to the floating namespace pool and/or one or more floating namespace volumes. Virtual queue interface 578 may include virtual queue enabler logic 578.1 configured to selectively determine floating namespaces to have virtual queues enabled for improving QoS. For example, virtual queue enabler logic 578.1 may use operations analyzer 548 and/or operating types assigned by flexible capacity manager 550 to determine which host namespaces use high volumes of processing, such as fast filling namespaces, and the floating namespace volumes that correspond to those namespaces may be selectively enabled for virtual queues and corresponding virtual interfaces and/or virtual channels. In some configurations, virtual queue enabler logic 578.1 may be configured to enable at least one virtual queue for the floating namespace pool for processing host storage commands to meet QoS standards.

In some configurations, virtual queue interface 578 may configure virtual queues to use specific sorting or prioritization logic. For example, virtual queue interface 578 may include a queue sorter 578.2 and/or priority logic 578.3 to manage the order of command processing from virtual storage queues. In some configurations, queue sorter 578.2 may analyze received host storage commands, sort incoming commands on one or more parameters, and maintain a queue order based on those parameters. For example, queue sorter 578.2 may use one or more parameters from command analyzer 576, such as payload size, to reorder command submission queues in size order from the largest to the smallest, such that host storage commands with a higher payload size are selected next for processing. In some configurations, priority logic 578.3 may operate in conjunction with priority logic in connection virtualization logic 560 and storage command manager 566 to modify the priority value set by connection virtualization logic 560 based on one or more command parameters. For example, priority logic 578.3 may compare the payload size determined by command analyzer 576 to a buffer size value (from buffer manager 580) and assign a higher priority value to host storage commands with a payload size exceeding the buffer size threshold. In some configurations, queue sorter 378.2 and/or priority logic 378.3 may operate across multiple virtual queues associated with different floating namespace volumes to influence host storage command processing order and, in some cases, load balancing across the virtual queues.

Buffer manager 580 may include interfaces, functions, parameters, and/or data structures configured to determine and/or modify host memory buffer settings for the data storage devices to support QoS targets. For example, buffer manager 580 may use one or more host memory buffer configurations based on data storage device, storage enclosure, and host configurations to determine the buffer spaces available for processing host storage commands. Buffer manager 580 may interface with configuration checker 574 to determine one or more configuration parameters. In some configurations, buffer manager 580 may interact with the configurations to modify one or more buffer configuration parameters. For example, upon configuration checker 574 determining the generation of a storage device supports host managed memory, buffer manager 580 may include enabling logic for host managed memory 580.1 and use that logic to enable HDM-DB for the floating namespace pool of storage devices that support it. Buffer manager 580 may be configured to determine the buffer size 580.2 for the storage device and/or namespaces. For example, each storage device may be configured with allocated buffer space in a host memory buffer for processing host storage commands and buffer manager 580 may determine buffer size 580.2 for any submitted host storage command. Buffer manager 580 may provide buffer size 580.2 to priority logic 578.3 for use in determining the buffer threshold to use for modifying the priority of submitted commands.

Figure 6:
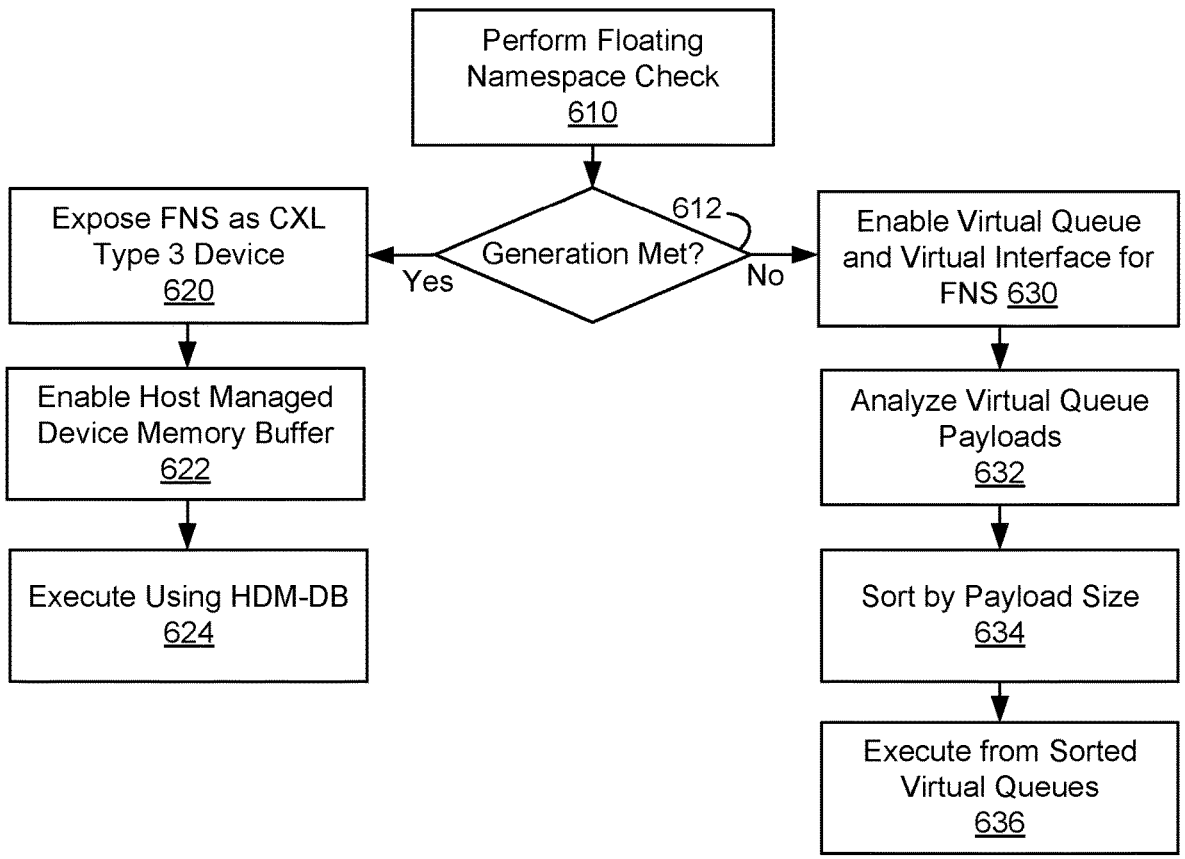
FIG. 6 is a flowchart of an example method of improving quality of service using a floating namespace pool.

As shown in FIG. 6, storage node 500 may be operated according to an example method for improving quality of service using a floating namespace pool, i.e., according to method 600 illustrated by blocks 610-636 in FIG. 6. Method 600 may improve QoS by selectively enabling a host managed device memory buffer and/or using payload size sorted virtual queues if the host managed device memory feature is not available.

At block 610, a floating namespace check may be performed. For example, as an entry point into any of the QoS methods described with regard to FIGS. 6-9, the storage controller may verify that flexible namespace features are enabled for at least some namespaces and a floating namespace pool is configured for the storage system.

At block 612, whether or not a generation condition is met may be determined. For example, the storage controller may check a generation type, such as PCIe Gen 5, Gen 4 or Gen 3 of the data storage devices to determine whether their interfaces support host managed memory devices. If yes, the data storage devices may be at least PCIe Gen 5 which supports CXL and method 600 may proceed to block 620. If no, the data storage device may be a lower generation that does not support CXL and method 600 may proceed to block 630.

At block 620, the floating namespace pool may be exposed as a memory device. For example, the memory spaces in the data storage device allocated to the floating namespace pool or one or more floating namespace volumes therein may be exposed as a type 3 CXL memory device.

At block 622, a host managed device memory buffer may be enabled. For example, the exposed memory device may support host management of the floating namespace pool memory locations using HDM-DB.

At block 624, host storage commands may be executed using the host managed device memory buffer with device coherent using back invalidation (HDM-DB). For example, the host system may directly issue host storage commands to the floating namespace pool to improve QoS.

At block 630, at least one virtual queue and virtual interface may be enabled for the floating namespace pool. For example, the storage controller may allocate at least one virtual queue pair and corresponding virtual interface connection to the floating namespace pool and/or to each floating namespace volume in the floating namespace pool.

At block 632, virtual queue payloads may be analyzed for payload size. For example, the storage controller may determine the payload size of each host storage command in the virtual queue from on or more command parameters.

At block 634, the host storage commands in the virtual queues may be sported by payload size. For example, the storage controller may modify the queue orders by inserting larger payload sizes ahead of smaller payload sizes to place the storage commands in descending order by payload sizes.

At block 636, host storage commands may be executed from the sorted virtual queues. For example, the data storage device NVM controller may select the next host storage command to execute from the sorted virtual queue and execute it against a memory location in the floating namespace pool.

Figure 7:
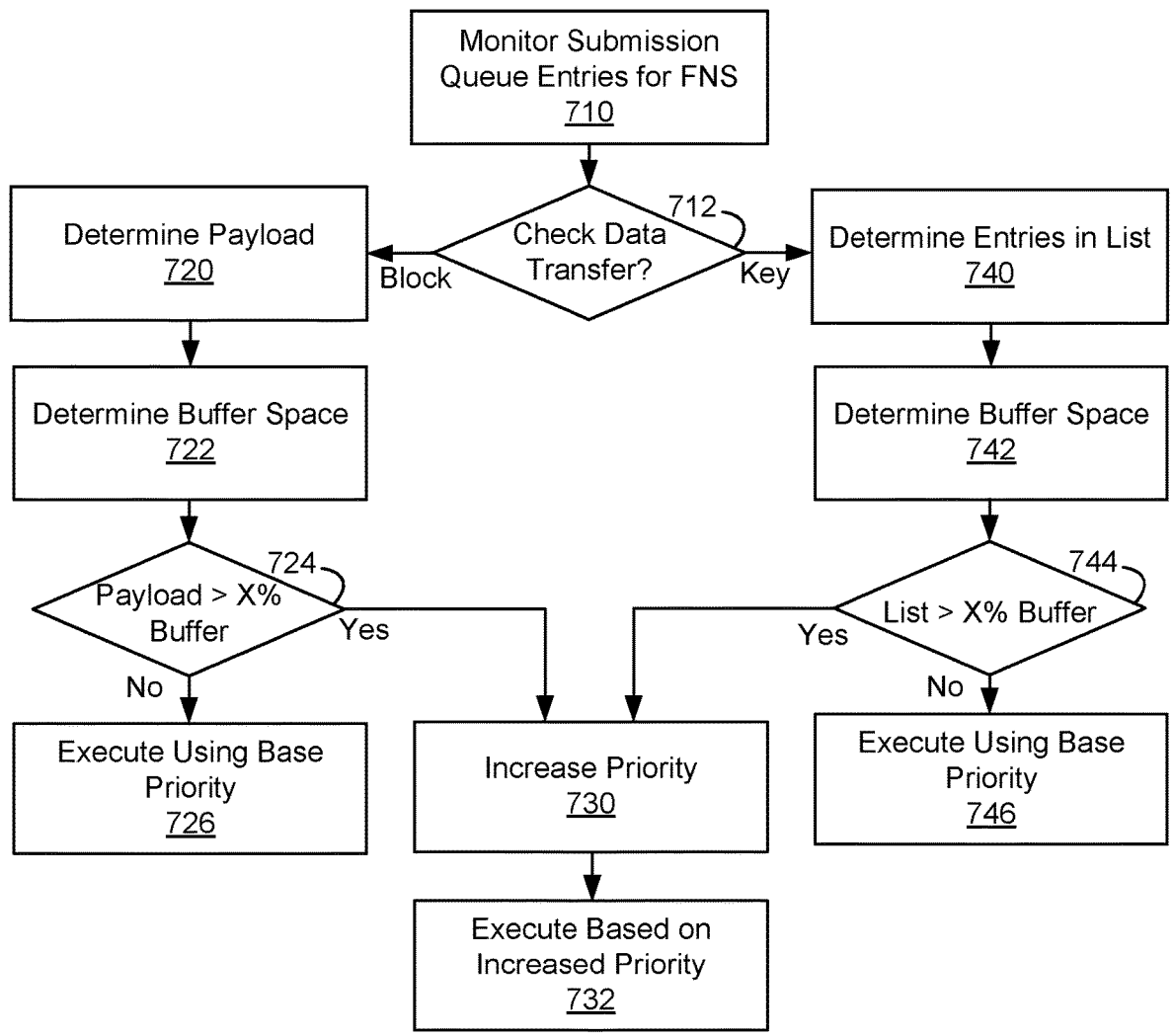
FIG. 7 is a flowchart of another example method of improving quality of service using a floating namespace pool.

As shown in FIG. 7, storage node 500 may be operated according to another example method for improving quality of service using a floating namespace pool, i.e., according to method 700 illustrated by blocks 710-746 in FIG. 7. Method 700 may improve QoS by supporting queue prioritization based on buffer thresholds for both PSP and SGL commands.

At block 710, submission queue entries for the floating namespace pool may be monitored. For example, the storage controller may receive submission queue entries and allocate some of them to the virtual queues for the floating namespace pool.

At block 712, the data transfer type may be checked. For example, the storage controller may analyze the storage commands to determine data transfer types selected from block data transfer (e.g., PRP) or key data transfer (e.g., SGL). If the data transfer type is block data transfer, method 700 may proceed to block 720. If the data transfer type is key data transfer, method 700 may proceed to block 740.

At block 720, payload may be determined. For example, based on the block size for the PRP command, the storage controller may determine the payload size.

At block 722, buffer space may be determined. For example, the storage controller may check a buffer space configuration for processing of host storage commands and may determine a buffer threshold based on the buffer space or a percentage of the buffer space.

At block 724, whether or not the payload is greater than the buffer threshold may be determined. For example, the storage controller may compare the payload size determined at block 720 to the buffer space determined at block 722 to determine whether the payload size exceeds the buffer threshold. If the buffer threshold is not met, method 700 may proceed to block 726. If the buffer threshold is met, method 700 may proceed to block 730.

At block 726, host storage commands may be executed using base priority. For example, the storage controller may be configured with a default priority scheme, such as first-in-first out, and the host storage commands may be processed from the virtual storage queue using the default ordering from the base priority.

At block 730, the priority of host storage commands may be increased. For example, responsive to the buffer threshold being met, a queue priority (QPRIO) parameter may be increased to urgent (e.g., urgent value=00b) for the storage command.

A4 block 732, host storage commands may be executed based on the increased priority. For example, the storage controller and/or NVM controller of the storage devices may be configured to select a next host storage command for processing that takes the urgent priority commands ahead of base priority commands.

At block 740, entries in the list may be determined. For example, based on the list of memory block references for the SGL command, the storage controller may determine the payload size.

At block 742, buffer space may be determined. For example, the storage controller may check a buffer space configuration for processing of host storage commands and may determine a buffer threshold based on the buffer space or a percentage of the buffer space.

At block 744, whether or not the list is greater than the buffer threshold may be determined. For example, the storage controller may compare the payload size determined at block 740 to the buffer space determined at block 742 to determine whether the payload size exceeds the buffer threshold. If the buffer threshold is not met, method 700 may proceed to block 746. If the buffer threshold is met, method 700 may proceed to block 730.

At block 746, host storage commands may be executed using base priority. For example, the storage controller may be configured with a default priority scheme, such as first-in-first out, and the host storage commands may be processed from the virtual storage queue using the default ordering from the base priority.

Figure 8:
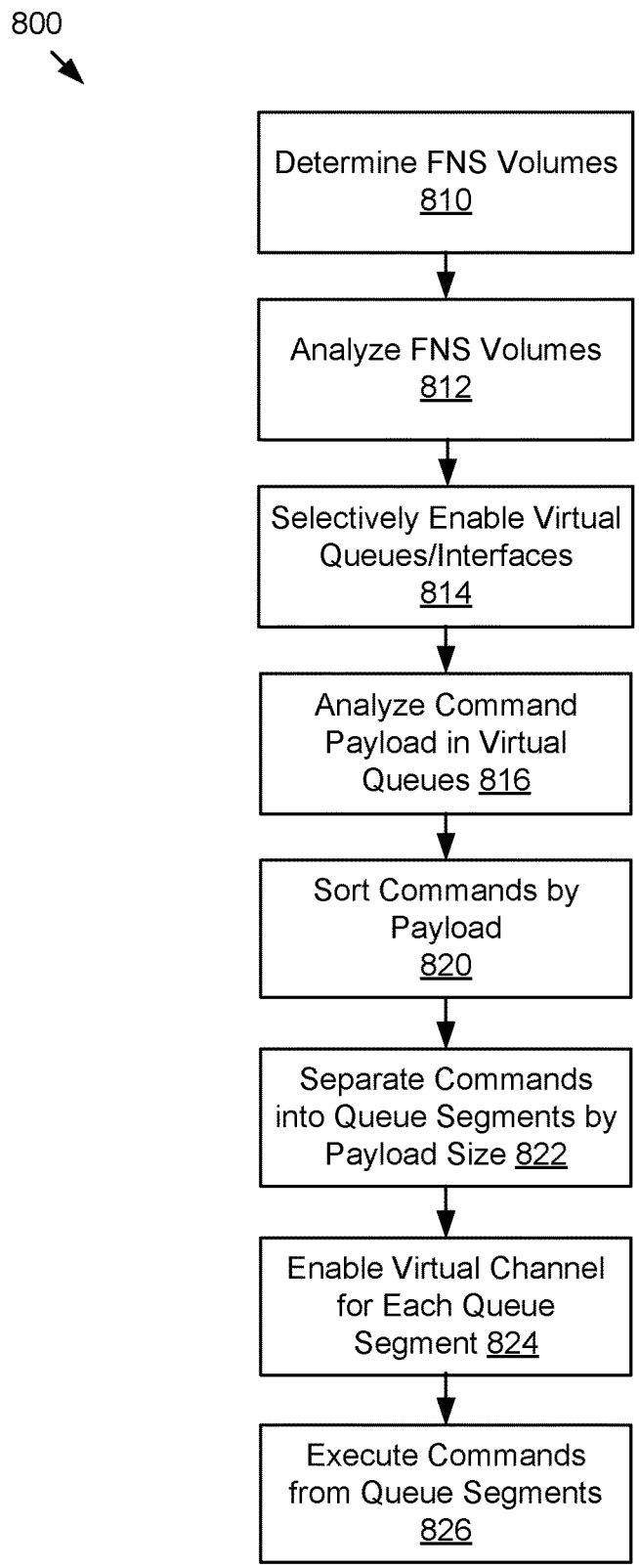
FIG. 8 is a flowchart of still another example method of improving quality of service using a floating namespace pool.

As shown in FIG. 8, storage node 500 may be operated according to another example method for improving quality of service using a floating namespace pool, i.e., according to method 800 illustrated by blocks 810-828 in FIG. 8. Method 800 may improve QoS by managing multiple virtual queues for the most performance intensive floating namespace volumes.

At block 810, the number of floating namespace volumes may be determined. For example, the storage controller may identify each floating namespace volume in the floating namespace pool.

At block 812, floating namespace volumes may be analyzed. For example, the storage controller may analyze the operating types of various floating namespace volumes to determine the processing load to identify processing intensive namespaces, such as fast filling namespaces, using data set management commands or similar operations analyzers to identify queue fill rates or use of processing bandwidth.

At block 814, virtual queues and virtual interfaces may be selectively enabled. For example, the storage controller may include a performance threshold (based on the QoS standards) and selectively enable virtual queues and virtual interfaces for the floating namespace volumes supporting performance intensive operations.

At block 816, storage command payloads in the virtual queues may be analyzed. For example, the storage controller may determine payload size for each host storage command.

At block 820, storage commands may be sorted by payload size. For example, the storage controller may sort the pending host storage commands in submission queues for the performance intensive namespaces to place the commands in ascending order.

At block 822, commands may be separated into the virtual queues by payload size. For example, the storage controller may generate segregated queue segments grouping sets of similarly sized host storage commands, such as four queue segments that each include a size range (e.g., 0-30%, 31-50%, 51-70%, and 71-100%), At block 824, a virtual channel may be enabled for each queue segment. For example, the storage controller may enable a dedicated traffic class and virtual channel for each queue segment.

At block 826, storage commands may be executed from the queue segments. For example, the storage controller and/or data storage devices may process host storage commands from the queue segments using the virtual channels to increase the priority of the sorted virtual queues.

Figure 9A:
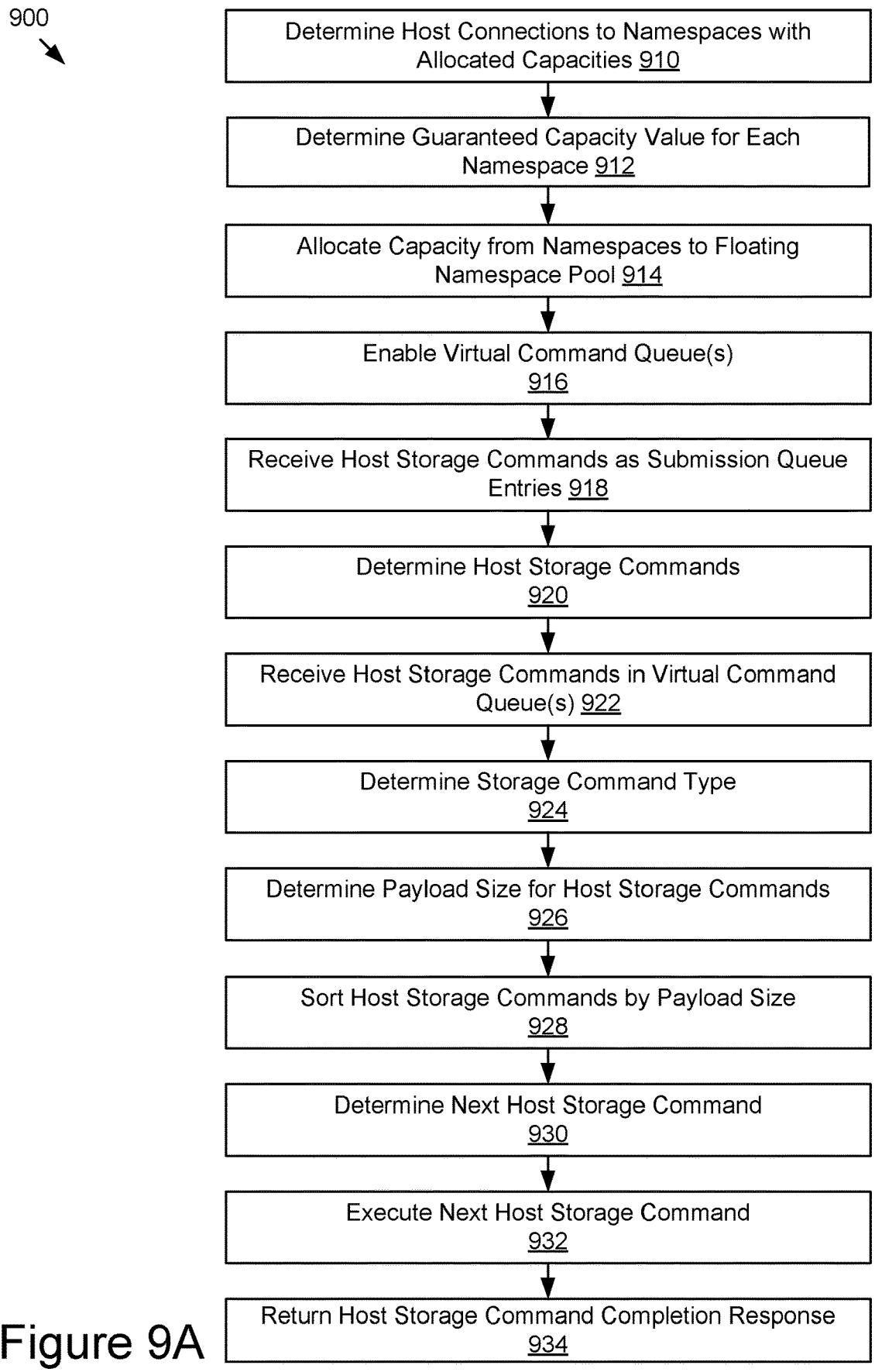
FIGS. 9A, 9B, and 9C are flowcharts of another example method of processing host storage commands using virtual command queues to a floating namespace pool.
Figure 9B:
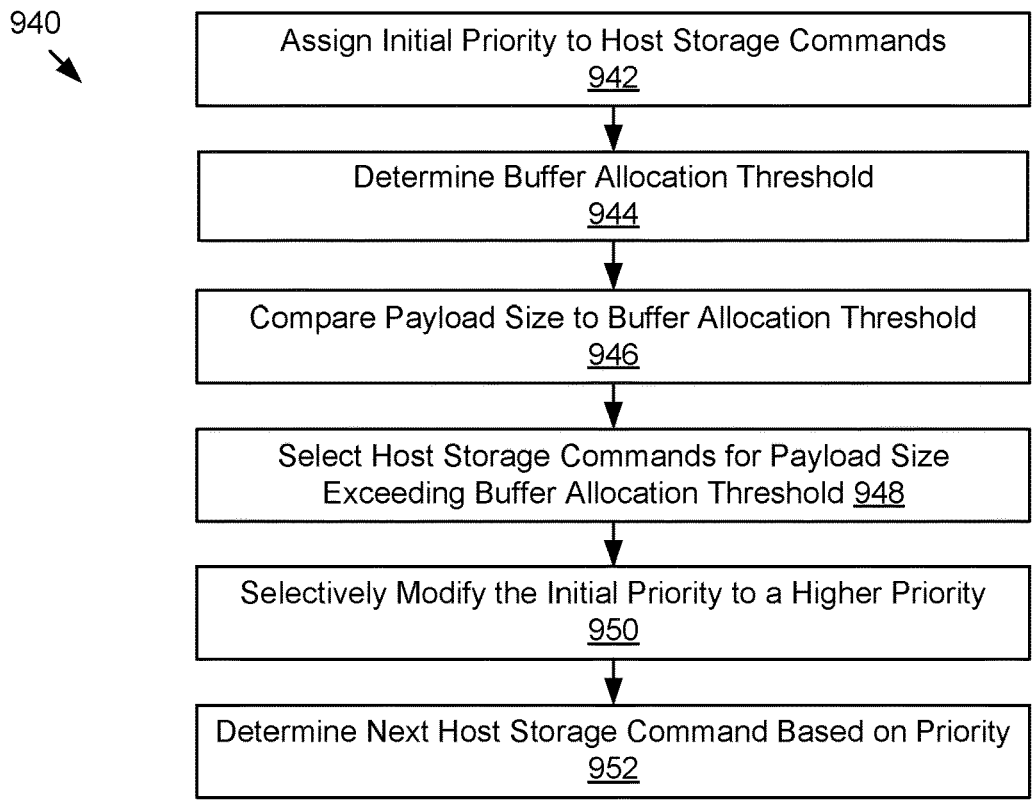
Figure 9C:
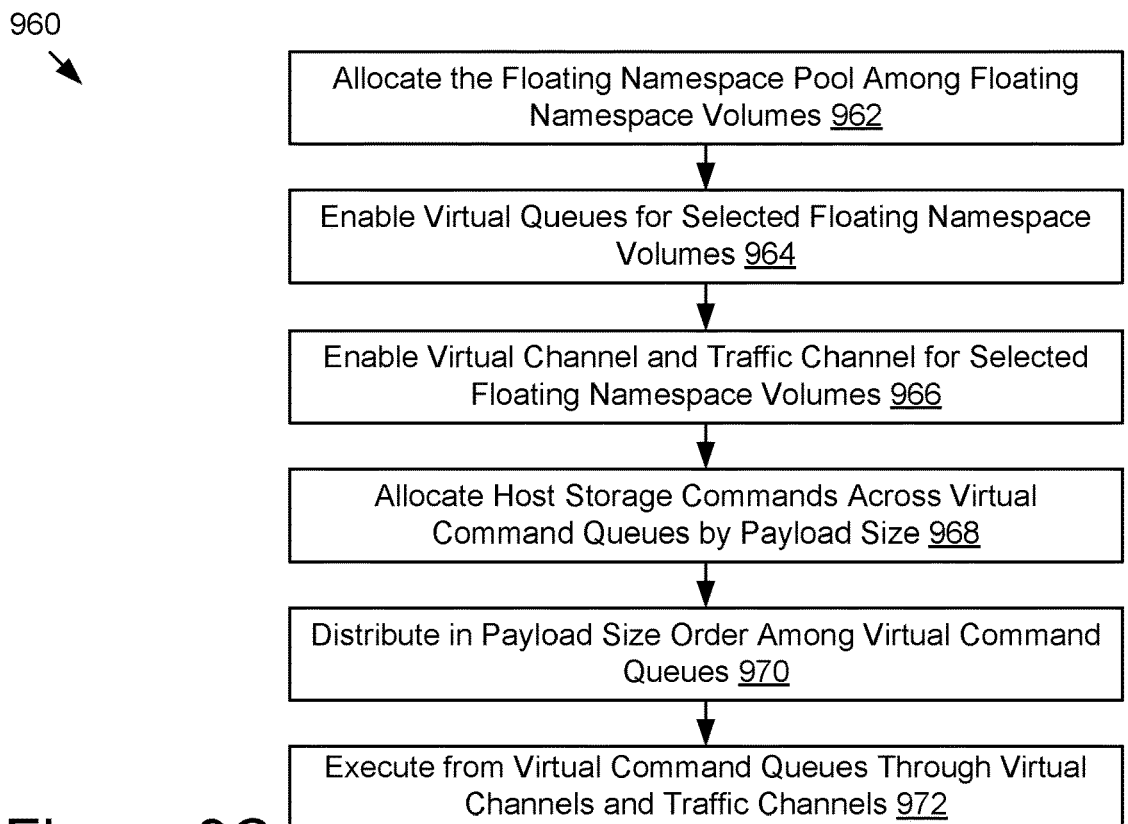

As shown in FIGS. 9A, 9B, and 9C, storage node 500 may be operated according to another example method for processing host storage commands using virtual command queues to a floating namespace pool, i.e., according to method 900 illustrated by blocks 910-972 in FIGS. 9A, 9B, and 9C. FIG. 9A may include steps for using virtual command queues to a floating namespace pool to improve processing of host storage commands. FIGS. 9B and 9C may include example sub-methods for supporting the determination of the next host storage command (e.g., block 930 in FIG. 9A) from virtual command queues.

At block 910, host connections may be determined to a set of namespaces with allocated capacities. For example, a namespace manager may be used to configure a set of namespaces that each have an allocated capacity corresponding to a defined set of memory locations in the storage device.

At block 912, a guaranteed capacity may be determined for each namespace. For example, as each namespace was created, the namespace manager may have determined a guaranteed capacity value based on default or custom allocation of guaranteed and flexible capacity.

At block 914, capacity from the namespaces may be allocated to a floating namespace pool. For example, the namespace manager may determine that the remainder of the allocated capacity for each namespace that is not part of the guaranteed capacity value corresponds to a flexible capacity value that can be contributed to a floating namespace pool.

At block 916, virtual command queues may be enabled for the floating namespace pool. For example, the storage controller may determine one or more floating namespace volumes in the floating namespace pool to be used for QoS improvements for one or more data storage devices.

At block 918, host storage commands may be received as submission queue entries. For example, the storage controller may receive host storage commands directed to host connections for target namespaces in the data storage devices.

At block 920, host storage commands may be determined. For example, the host storage commands received as submission queue entries associated with a host connection identifier may be identified by connection virtualization logic for assignment to a backend submission queue of a data storage device.

At block 922, host storage commands may be received in virtual command queues. For example, the storage controller may assign the host storage command to a virtual submission queue for execution from the floating namespace pool.

At block 924, a storage command type may be determined. For example, the storage controller may determine a data transport type, such as PRP or SGL, from the parameters of the host storage command.

At block 926, a payload size may be determined. For example, the storage controller may calculate the payload size using different work streams for different storage command types.

At block 928, host storage commands may be sorted by payload size. For example, the storage controller may sort the host storage commands directed to the virtual queues in ascending order based on payload size to place the largest payloads at the top of the queue.

At block 930, a next host storage command may be determined. For example, the storage controller may select the next host storage command from a virtual queue for execution.

At block 932, the next host storage command may be executed. For example, the data storage device hosting target memory locations in the floating namespace pool may execute the backend storage operations corresponding to the host storage command.

At block 934, a host storage command completion response may be returned. For example, the data storage device and/or storage controller may return a response from processing the host storage command to a corresponding host completion queue for the host connection identifier associated with the host storage command.

In some configurations, sub-method 940 may operate in conjunction with the blocks of method 900 in FIG. 9A. At block 942, an initial priority may be assigned to host storage commands. For example, when host storage commands are determined at block 920, they may be assigned a priority based on host priority values and/or default storage controller priority.

At block 944, a buffer allocation threshold may be determined. For example, the host command buffer used for processing host storage commands may include a buffer size and a buffer threshold that is a percentage of that size may be configured in the storage controller as the buffer allocation threshold.

At block 946, payload size for the host storage commands may be compared to the buffer allocation threshold. For example, the storage controller may use the payload size determined at block 926 and compare it to the buffer allocation threshold to determine whether the payload size meets the buffer allocation threshold.

At block 948, host storage commands may be selected for payload size exceeding the buffer allocation threshold. For example, the storage controller may select the host storage commands with payload sizes larger than the buffer allocation threshold for receiving higher priority handling.

At block 950, initial priority may be selectively modified to a higher priority. For example, the storage controller may increase the priority value of the host storage commands selected at block 948.

At block 952, the next host storage command may be determined based on the priority. For example, the storage controller and/or data storage devices may select the host storage commands selected at block 948 ahead of those not selected based on the higher priority value associated with those storage commands.

In some configurations, sub-method 960 may operate in conjunction with the blocks of method 900 in FIG. 9A. At block 962, a floating namespace pool may be allocated among floating namespace volumes. For example, following allocation of the floating namespace pool at block 914, the storage controller may allocate one or more portions of the floating namespace pool to specific floating namespace volumes.

At block 964, virtual queues may be enabled for selected floating namespace volumes. For example, the storage controller may determine namespaces needing additional processing and select floating namespace volumes over a processing threshold to have virtual queues enabled.

At block 966, virtual channels and traffic channels may be enabled for selected floating namespace volumes. For example, the storage controller may enable virtual channels and traffic channels on a one-to-one basis for the selected virtual queues to allow more efficient backend processing by the data storage devices, At block 968, host storage commands may be allocated across virtual command queues by payload size. For example, the storage controller may divide one or more virtual command queues into queue segments, where each queue segment corresponds to a range of payload sizes.

At block 970, host storage commands may be distributed among the virtual command queues in payload size order. For example, the storage controller may use the payload sorted set of host storage commands to distribute the host storage commands among the queue segments such that each queue segment includes host storage commands in payload size order from largest to smallest.

At block 972, host storage commands may be executed from the virtual command queues through dedicated virtual channels and traffic channels. For example, the storage controller may connect the virtual command queues using the dedicated virtual channels and traffic channels to complete processing of the host storage commands by the data storage devices using the queue segments to prioritize and distribute processing, determining the next host storage command for the data block. Virtual channels may be mapped to traffic channels on a one-to-one basis to prioritize the command execution.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a storage controller configured to:
 allocate, for at least one data storage device from a plurality of data storage devices, a floating namespace pool comprised of a plurality of data units, wherein:
  each data storage device of the plurality of data storage devices comprises:
   a non-volatile storage medium configured for a plurality of host namespaces; and
   a host interface configured to receive host storage commands directed to that data storage device;
  at least a portion of data units allocated to the plurality of host namespaces is allocated to the floating namespace pool; and
  at least one data unit of the plurality of data units is allocated to a host namespace in the at least one data storage device;
 determine a plurality of host storage commands directed to the at least one data storage device;
 determine a payload size for each host storage command of the plurality of host storage commands;
 determine, based on relative payload sizes of each host storage command of the plurality of host storage commands, a next host storage command from the plurality of host storage commands; and
 execute, using a data unit in the floating namespace pool, the next host storage command.

2. The system of claim 1, wherein the storage controller is further configured to expose the floating namespace pool as a host-managed device memory.

3. The system of claim 1, wherein the storage controller is further configured to:
 enable a virtual command queue for the floating namespace pool;
 receive the plurality of host storage commands in the virtual command queue; and
 sort the plurality of host storage commands based on the relative payload sizes to determine the next host storage command.

4. The system of claim 3, wherein:
 sorting the plurality of host storage commands places the plurality of host storage commands in size order from largest payload size to smallest payload size in the virtual command queue; and
 the next host storage command has the largest payload size.

5. The system of claim 1, wherein:
 the storage controller is further configured to:
  receive each host storage command of the plurality of host storage commands as a submission queue entry; and
  determine whether each host storage command is a storage command type selected from:
   a block storage command corresponding to a block payload size; and
   a key storage command corresponding to a scatter gather list; and
 determining the payload size for each host storage command is based on:
  the block payload size for block storage commands; and
  aggregation of entries of the scatter gather list for key storage commands.

6. The system of claim 5, wherein:
 the storage controller is further configured to:
  assign, responsive to each submission queue entry, an initial priority to each host storage command; and
  selectively modify, responsive to the payload size for each host storage command, the initial priority for selected host storage commands to a higher priority than the initial priority for that host storage command; and
 determining the next host storage command is based on the higher priority for at least one host storage command.

7. The system of claim 6, wherein the storage controller is further configured to:
 determine a buffer allocation threshold for the host storage commands;
 compare the payload size for each host storage command to the buffer allocation threshold; and
 select host storage commands for the higher priority responsive to the payload size for that host storage command exceeding the buffer allocation threshold.

8. The system of claim 1, wherein:
 the floating namespace pool is allocated among a plurality of floating namespace volumes;
 the storage controller is further configured to:
  enable, for each floating namespace volume of the plurality of floating namespace volumes, a virtual command queue; and
  allocate host storage commands across the virtual command queues of the plurality of floating namespace volumes; and
 determining the next host storage command comprises selecting a host storage command from a next virtual command queue on a distributed basis among the virtual command queues of the plurality of floating namespace volumes.

9. The system of claim 8, wherein:
the storage controller is further configured to:
- enable a virtual channel for each virtual command queue of the plurality of floating namespace volumes;
- sort the plurality of host storage commands by payload size; and
- distribute the plurality of host storage commands in payload size order among the virtual command queues for the plurality of floating namespace volumes; and
the distributed basis comprises parallel processing of the virtual command queues for the plurality of floating namespace volumes using the corresponding virtual channels.

10. A computer-implemented method, comprising:
allocating, for at least one data storage device from a plurality of data storage devices, a floating namespace pool comprised of a plurality of data units, wherein:
- each data storage device of the plurality of data storage devices comprises:
  - a non-volatile storage medium configured for a plurality of host namespaces; and
  - a host interface configured to receive host storage commands directed to that data storage device;
- at least a portion of data units allocated to the plurality of host namespaces is allocated to the floating namespace pool; and
- at least one data unit of the plurality of data units is allocated to a host namespace in the at least one data storage device;
determining a plurality of host storage commands directed to the at least one data storage device;
determining a payload size for each host storage command of the plurality of host storage commands;
determining, based on relative payload sizes of each host storage command of the plurality of host storage commands, a next host storage command from the plurality of host storage commands; and
executing, using a data unit in the floating namespace pool, the next host storage command.

11. The computer-implemented method of claim 10, further comprising:
exposing the floating namespace pool as a host-managed device memory.

12. The computer-implemented method of claim 10, further comprising:
- enabling a virtual command queue for the floating namespace pool;
- receiving the plurality of host storage commands in the virtual command queue; and
- sorting the plurality of host storage commands based on the relative payload sizes to determine the next host storage command.

13. The computer-implemented method of claim 12, wherein:
- sorting the plurality of host storage commands places the plurality of host storage commands in size order from largest payload size to smallest payload size in the virtual command queue; and
- the next host storage command has the largest payload size.

14. The computer-implemented method of claim 10, further comprising:
receiving each host storage command of the plurality of host storage commands as a submission queue entry; and
determining whether each host storage command is a storage command type selected from:
- a block storage command corresponding to a block payload size; and
- a key storage command corresponding to a scatter gather list;
wherein determining the payload size for each host storage command is based on:
- the block payload size for block storage commands; and
- aggregation of entries of the scatter gather list for key storage commands.

15. The computer-implemented method of claim 14, further comprising:
- assigning, responsive to each submission queue entry, an initial priority to each host storage command; and
- selectively modifying, responsive to the payload size for each host storage command, the initial priority for selected host storage commands to a higher priority than the initial priority for that host storage command, wherein determining the next host storage command is based on the higher priority for at least one host storage command.

16. The computer-implemented method of claim 15, further comprising:
- determining a buffer allocation threshold for the host storage commands;
- comparing the payload size for each host storage command to the buffer allocation threshold; and
- selecting host storage commands for the higher priority responsive to the payload size for that host storage command exceeding the buffer allocation threshold.

17. The computer-implemented method of claim 10, further comprising:
- allocating the floating namespace pool among a plurality of floating namespace volumes;
- enabling, for each floating namespace volume of the plurality of floating namespace volumes, a virtual command queue; and
- allocating host storage commands across the virtual command queues of the plurality of floating namespace volumes, wherein determining the next host storage command comprises selecting a host storage command from a next virtual command queue on a distributed basis among the virtual command queues of the plurality of floating namespace volumes.

18. The computer-implemented method of claim 17, further comprising:
- enabling a virtual channel and corresponding traffic channel for each virtual command queue of the plurality of floating namespace volumes;
- sorting the plurality of host storage commands by payload size; and
- distributing the plurality of host storage commands in payload size order among the virtual command queues for the plurality of floating namespace volumes, wherein the distributed basis comprises parallel processing of the virtual command queues for the plurality of floating namespace volumes using the corresponding virtual channels and traffic channels.

19. A system comprising:
at least one processor;
at least one memory;
a plurality of data storage devices, wherein:
- each data storage device of the plurality of data storage devices comprises:

a non-volatile storage medium configured for a plurality of host namespaces; and a host interface configured to receive host storage commands directed to that data storage device; and wherein at least a portion of data units allocated to the plurality of host namespaces is allocated to a floating namespace pool;

means for allocating, for at least one data storage device of the plurality of data storage devices, the floating namespace pool comprised of a plurality of data units;

means for determining a plurality of host storage commands directed to the at least one data storage device;

means for determining a payload size for each host storage command of the plurality of host storage commands;

means for determining, based on relative payload sizes of each host storage command of the plurality of host storage commands, a next host storage command from the plurality of host storage commands; and means for executing, using a data unit in the floating namespace pool, the next host storage command.

\* \* \* \* \*